US012768459B2

(12) United States Patent
Aono

(10) Patent No.: US 12,768,459 B2
(45) Date of Patent: Oct. 20, 2026

(54) VALVE DEVICE

(71) Applicant: DENSO CORPORATION, Kariya-city (JP)

(72) Inventor: Yoshitada Aono, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 193 days.

(21) Appl. No.: 18/650,980

(22) Filed: Apr. 30, 2024

(65) Prior Publication Data

US 2024/0280181 A1 Aug. 22, 2024

Related U.S. Application Data

(63) Continuation of application No. PCT/JP2023/007071, filed on Feb. 27, 2023.

(30) Foreign Application Priority Data

Mar. 3, 2022 (JP) ................................ 2022-032928

(51) Int. Cl.
*F16K 11/16* (2006.01)
*F16K 3/06* (2006.01)
(Continued)

(52) U.S. Cl.
CPC .............. *F16K 11/166* (2013.01); *F16K 3/06* (2013.01); *F16K 3/314* (2013.01); *F16K 11/074* (2013.01);
(Continued)

(58) Field of Classification Search
CPC ...... F16K 11/166; F16K 25/00; F16K 31/041; F16K 3/06; F16K 3/314; F16K 11/074; F16K 31/04
See application file for complete search history.

(56) References Cited

U.S. PATENT DOCUMENTS 4,653,538 A 3/1987 Tsutsui et al.
5,279,463 A * 1/1994 Holl ........................ B01F 23/53 241/237

(Continued)

FOREIGN PATENT DOCUMENTS

JP S6397764 A 4/1988
JP H08178091 A 7/1996

OTHER PUBLICATIONS

U.S. Appl. No. 18/658,010 to Atsushi Tanaka et al., filed May 8, 2024 (46 pages).

*Primary Examiner* — Craig M Schneider
*Assistant Examiner* — Christopher D Ballman
(74) *Attorney, Agent, or Firm* — Nixon & Vanderhye P.C.

(57) ABSTRACT

A valve device includes a first valve element and a second valve element. The first valve element has a first sliding surface which is opposed to the second valve element. The second valve element has a second sliding surface which is opposed to the first valve element. The first sliding surface and the second sliding surface are configured to slide relative to each other to change an opening degree of an opening between a first flow passage and a second flow passage. An edge portion of at least one sliding surface among the first sliding surface and the second sliding surface is joined to a sloped surface which is sloped by an acute angle relative to a mating sliding surface which is another sliding surface among the first sliding surface and the second sliding surface and mates with the at least one sliding surface.

9 Claims, 11 Drawing Sheets

(51) Int. Cl.
*F16K 3/314* (2006.01)
*F16K 11/074* (2006.01)
*F16K 25/00* (2006.01)
*F16K 31/04* (2006.01)

(52) U.S. Cl.
CPC .............. *F16K 25/00* (2013.01); *F16K 31/04* (2013.01); *F16K 31/041* (2013.01)

(56) References Cited

U.S. PATENT DOCUMENTS

| | | | | |
|---|---|---|---|---|
| 8,011,320 | B2 * | 9/2011 | Danel | F16K 11/074 118/723 R |
| 8,622,086 | B2 * | 1/2014 | Servin | F16K 99/0001 251/367 |
| 8,714,520 | B2 * | 5/2014 | Sun | F16K 25/005 251/208 |
| 8,960,231 | B2 * | 2/2015 | Picha | G01N 30/20 137/625.46 |
| 9,616,726 | B2 * | 4/2017 | Harla | F16K 3/08 |
| 9,638,340 | B2 * | 5/2017 | Bachofer | F16K 11/0743 |
| 9,803,759 | B2 * | 10/2017 | Bachofer | F16K 11/0743 |
| 2015/0233476 | A1 | 8/2015 | Bachofer | |
| 2017/0152956 | A1 * | 6/2017 | Sansum | F16K 31/60 |

* cited by examiner

COMPARATIVE EXAMPLE

VALVE DEVICE

CROSS REFERENCE TO RELATED APPLICATIONS

This application is a continuation application of International Application No. PCT/JP2023/007071 filed on Feb. 27, 2023, which designated the U.S. and claims the benefit of priority from Japanese Patent Application No. 2022-032928 filed on Mar. 3, 2022. The entire disclosures of all of the above applications are incorporated herein by reference.

TECHNICAL FIELD

The present disclosure relates to a valve device.

BACKGROUND

Previously, there has been proposed a valve device that includes two valve elements. One of these valve elements is configured to slide relative to the other one of the valve elements to regulate a flow rate of a liquid.

SUMMARY

This section provides a general summary of the disclosure, and is not a comprehensive disclosure of its full scope or all of its features.

According to the present disclosure, there is provided a valve device configured to regulate a flow rate of a liquid. The valve device includes a first valve element and a second valve element. The first valve element has a first sliding surface which is opposed to the second valve element. The second valve element has a second sliding surface which is opposed to the first valve element. The first sliding surface and the second sliding surface are configured to slide relative to each other to change an opening degree of an opening between a first flow passage and a second flow passage. An edge portion of at least one sliding surface among the first sliding surface and the second sliding surface is joined to a sloped surface which is sloped by an acute angle relative to a mating sliding surface which is another sliding surface among the first sliding surface and the second sliding surface and mates with the at least one sliding surface.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Figure 1:
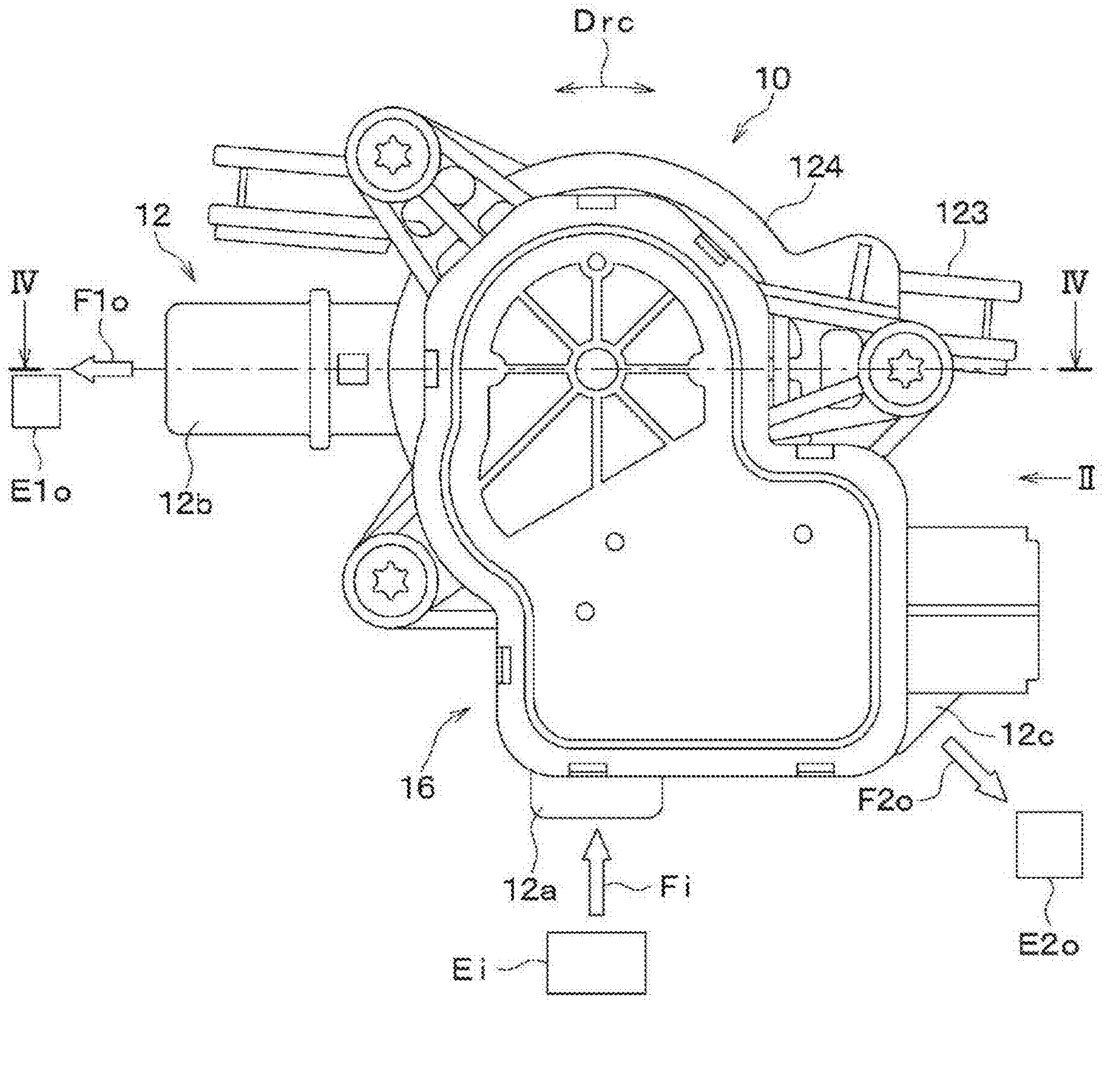
FIG. 1 is a plan view of a valve device according to a first embodiment.

Previously, there has been proposed a valve device that includes two valve elements. One of these valve elements is configured to slide relative to the other one of the valve elements to regulate a flow rate of a liquid.

According to the study of the inventor of the present application, at the time of replacing a component(s) of the valve device described above, the liquid is drained out from a flow passage of the valve device, so that the flow passage is dried out easily. When the flow passage is dried out, residual components (e.g., calcium and silica) of the liquid solidify. This solidification may possibly interfere with the sliding movement between the two valve elements.

According to one aspect of the present disclosure, there is provided a valve device configured to regulate a flow rate of a liquid. The valve device includes: a first valve element that is placed in a first flow passage which is configured to conduct the liquid; and a second valve element that is placed in the first flow passage. A surface of the first valve element has a first sliding surface which is opposed to the second valve element. A surface of the second valve element has a second sliding surface which is opposed to the first valve element. The first sliding surface and the second sliding surface are configured to slide relative to each other to change an opening degree of an opening between the first flow passage and a second flow passage. An edge portion of at least one sliding surface among the first sliding surface and the second sliding surface is joined to a sloped surface which is sloped by an acute angle relative to a mating sliding surface which is another sliding surface among the first sliding surface and the second sliding surface and mates with the at least one sliding surface.

As described above, the edge portion of the at least one sliding surface among the first sliding surface and the second sliding surface is joined to the sloped surface which is sloped by the acute angle relative to the mating sliding surface. In this way, when the liquid is drained out from the valve device, a puddle of the liquid is formed by a surface tension between the sloped surface and the mating sliding surface. This makes it difficult for the solidification of the residual components to occur between the first sliding surface and the second sliding surface. Thereby, the possibility of interfering with the sliding movement between the first valve element and the second valve element is reduced.

Hereinafter, embodiments of the present disclosure will be described with reference to the drawings. In each of the following embodiments, portions, which are the same or equivalent to each other, will be indicated by the same reference signs.

First Embodiment

The first embodiment will be described with reference to the drawings. A valve device 10 of the present embodiment is, for example, a control valve used in a temperature adjusting device for executing cabin air conditioning and battery temperature adjustment in an electric vehicle. Specifically, the valve device 10 is placed in a coolant circuit configured to conduct a water-based coolant through, for example, a heat exchanger for the cabin air conditioning and/or a heat exchanger for the battery temperature adjustment to regulate a flow rate of the water-based coolant flowing in the coolant circuit.

In the temperature adjusting device of the electric vehicle, it is required to finely adjust the temperature according to each of the cabin air conditioning and the battery temperature adjustment. Therefore, the valve device 10 used in the temperature adjusting device of the electric vehicle is required to accurately control the flow rate of the water-based coolant in comparison to a valve device used in a coolant circuit of an internal combustion engine.

The valve device 10 is installed in a fluid circulation circuit where a fluid is circulated for the cabin air conditioning and the battery temperature adjustment. The valve device 10 is capable of opening, closing, and switching a flow passage in the fluid circulation circuit where the valve device 10 is installed, as well as controlling the flow rate of the fluid supplied into each corresponding flow passage with high precision. A liquid is used as the fluid. For example, LLC, which contains ethylene glycol and water, is used as the liquid. Here, LLC stands for Long Life Coolant.

Figure 2:
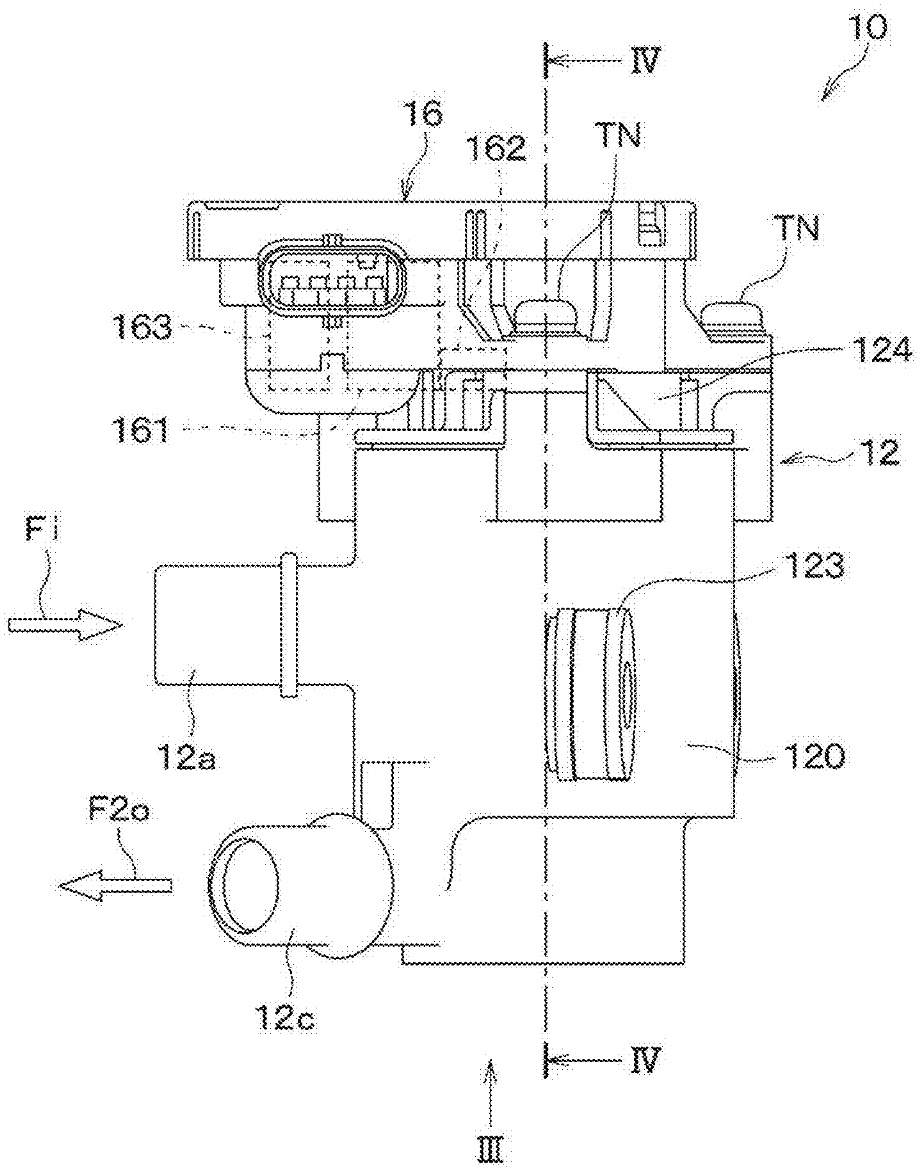
FIG. 2 is a view taken in a direction of an arrow II in FIG. 1.
Figure 3:
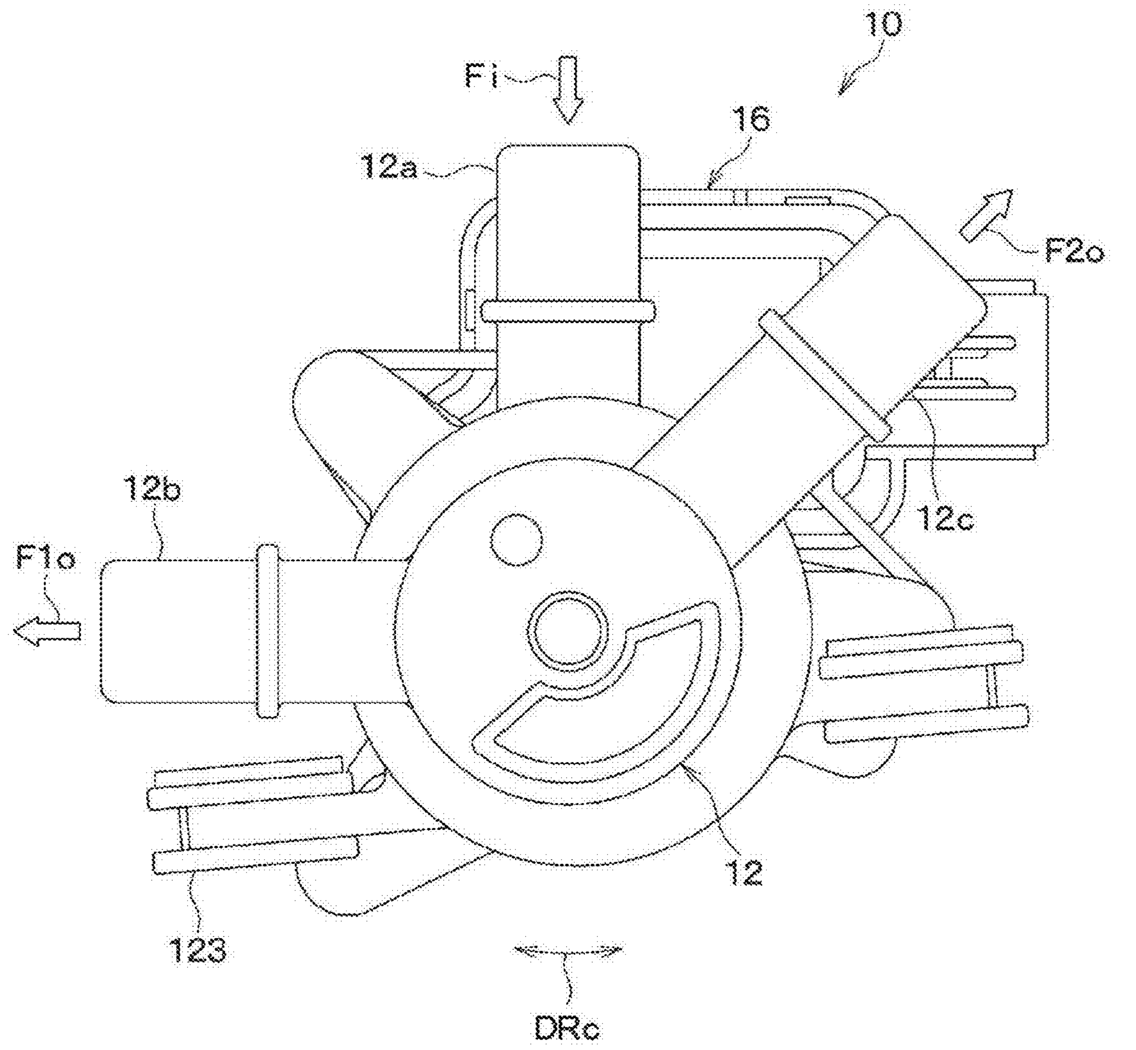
FIG. 3 is a view taken in a direction of an arrow III in FIG. 2.

As shown in FIGS. 1 to 3, the valve device 10 includes a housing 12 that forms a fluid passage that is formed at an inside of the housing 12 and conducts the fluid. The valve device 10 is a three-way valve and has an inlet 12*a* for inputting the fluid, a first outlet 12*b* for outputting the fluid, and a second outlet 12*c* for outputting the fluid while the inlet 12*a*, the first outlet 12*b* and the second outlet 12*c* are formed at the housing 12. The valve device 10 functions not only as a flow path switching valve but also functions as a flow rate regulating valve that regulates a flow rate ratio between a flow rate of the fluid, which flows from the inlet 12*a* to the first outlet 12*b*, and a flow rate of the fluid, which flows from the inlet 12*a* to the second outlet 12*c*.

The valve device 10 is a disc valve that performs a valve opening/closing operation by rotating a valve element, which is in a form of a circular disk, around a shaft central axis CL of a shaft 18 described later.

Figure 4:
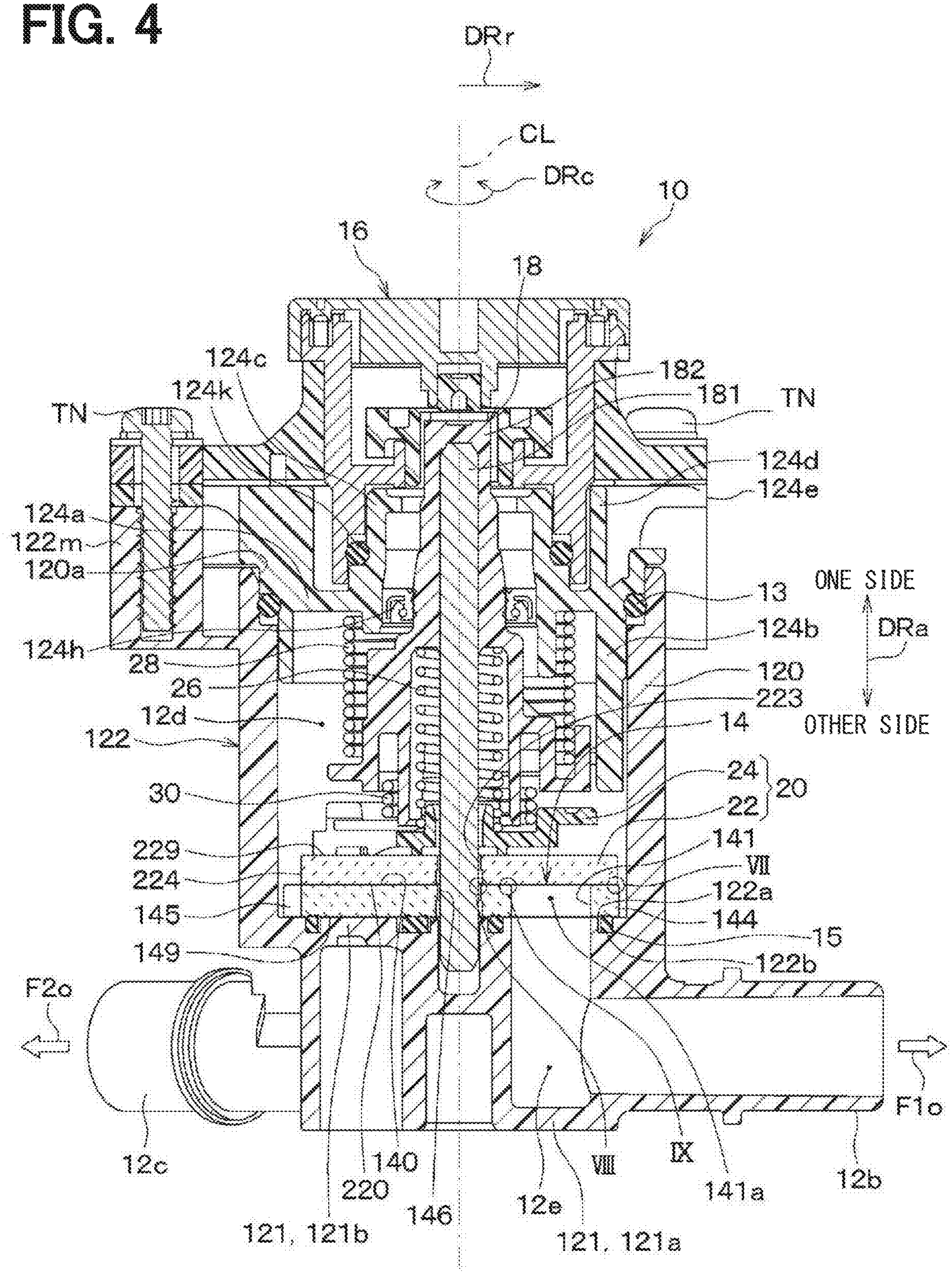
FIG. 4 is a cross-sectional view taken along line IV-IV in FIG. 2.
Figure 5:
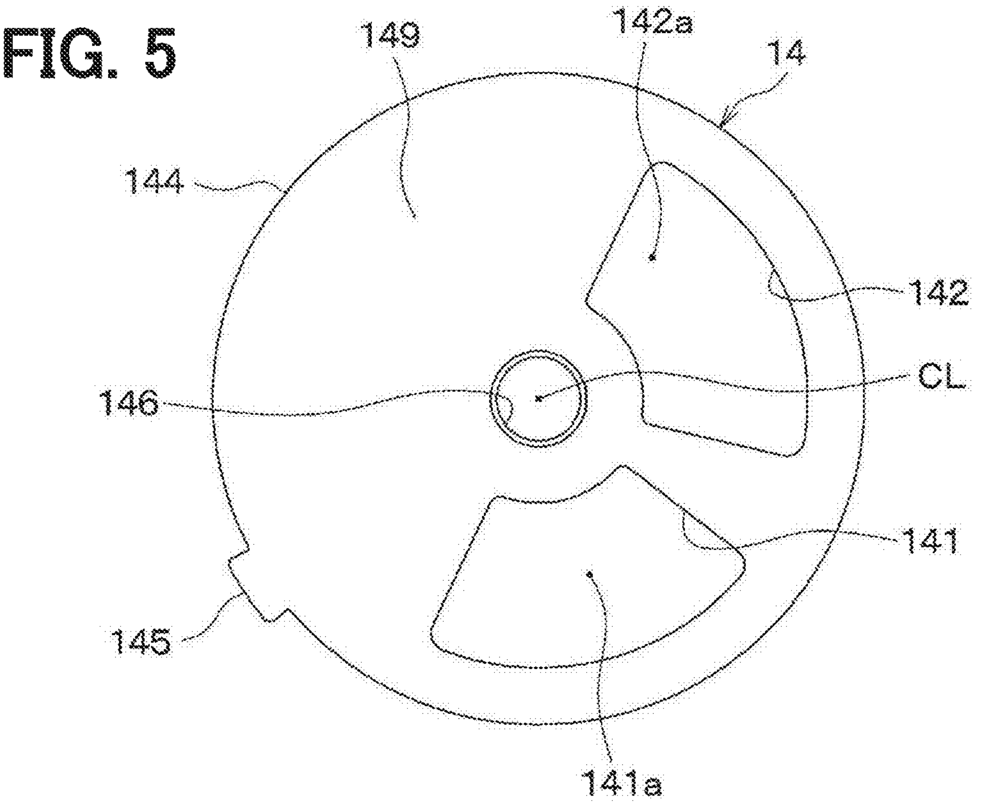
FIG. 5 is a bottom view of a stationary valve element alone.

As shown in FIGS. 4 and 5, the valve device 10 includes a stationary valve element 14, the shaft 18, a rotor 20, a compression spring 26, a first torsion spring 28 and a second torsion spring 30 which are received at the inside of the housing 12. Furthermore, in the valve device 10, a drive device 16 is placed at an outside of the housing 12.

The housing 12 is a non-rotatable member that does not rotate. The housing 12 is made of, for example, a resin material. The housing 12 includes a main body 120 and a main-body cover 124. The main body 120 is shaped in a bottomed tubular form. The main-body cover 124 closes an opening 120*a* of the main body 120 which is located at one side of the main body 120 in an axial direction DRa. A seal member 13, such as an O-ring, is placed between the main body 120 and the main-body cover 124 to close a gap between the main body 120 and the main-body cover 124.

The axial direction DRa is a direction along the shaft central axis CL. Furthermore, a circumferential direction about the shaft central axis CL will be simply referred to as a circumferential direction DRc, and a radial direction of the shaft central axis CL will be simply referred to as a radial direction DRr.

The main body 120 has: a bottom wall 121 which forms a bottom surface; and a peripheral wall 122, which circumferentially surrounds the shaft central axis CL. The bottom wall 121 and the peripheral wall 122 cooperate with the main-body cover 124 to form a receiving space that receives the stationary valve element 14 and the rotor 20 described later. The bottom wall 121 and the peripheral wall 122 are formed integrally in one-piece as an integral molded product.

The bottom wall 121 has two portions, which are stepped (recessed) and correspond to a first passage hole 141*a* and a second passage hole 142*a*, respectively, of the stationary valve element 14 described later. Specifically, a distance between the main-body cover 124 and each of the two portions of the bottom wall 121, which are opposed to the first passage hole 141*a* and the second passage hole 142*a*, respectively, of the stationary valve element 14, is larger than a distance between the main-body cover 124 and another portion of the bottom wall 121, which is other than these two portions of the bottom wall 121.

The bottom wall 121 has two stepped portions (recessed portions) 121*a* and a non-stepped portion 121*b*. The two stepped portions 121*a* are stepped (recessed) and are respectively opposed to the first passage hole 141*a* and the second passage hole 142*a* of the stationary valve element 14. The non-stepped portion 121*b* is not stepped and is opposed to an outlet surface 149 of the stationary valve element 14. At the bottom wall 121, each of the stepped portions 121*a* is largely spaced from the stationary valve element 14, and the non-stepped portion 121*b* is adjacent to the stationary valve element 14.

The peripheral wall 122 has the inlet 12*a* at a location that is closer to the opening 120*a* than to the bottom wall 121. The peripheral wall 122 also has the first outlet 12*b* and the second outlet 12*c* at a location that is closer to the bottom wall 121 than to the opening 120*a*. Each of the inlet 12*a*, the first outlet 12*b* and the second outlet 12*c* is a tubular member that has a flow passage therein.

A mounting portion 122*a*, on which the stationary valve element 14 is placed, is formed at the inside of the peripheral wall 122 at a location between the portion of the peripheral wall 122, at which the inlet 12*a* is formed, and the portion of the peripheral wall 122, at which the outlets 12*b*, 12*c* are formed. A receiving groove 122*b*, which receives a gasket 15, is formed at the mounting portion 122*a*.

A plurality of main-body attachment portions 122*m* and a plurality of installation portions 123 are formed at the outside of the peripheral wall 122. The main-body cover 124 is attached to the main body 120 through the main-body attachment portions 122*m* with a plurality of fastening members TN. The valve device 10 is installed to the electric vehicle through the installation portions 123.

The inside of the housing 12 is partitioned by the mounting portion 122*a* into an inlet-side space 12*d* and an outlet-side space 12*e*. The inlet-side space 12*d* is a flow passage communicated with the inlet 12*a* at the inside of the housing 12 and is also the receiving space which receives the stationary valve element 14 and the rotor 20. The outlet-side space 12*e* is a flow passage that is communicated with the first outlet 12*b* and the second outlet 12*c* at the inside of the housing 12. The inlet-side space 12*d* serves as a first flow passage, and the outlet-side space 12*e* serves as a second flow passage.

Although not shown in the drawing, a partition portion, which is shaped in a plate form, is formed at the inside of the main body 120. The partition portion partitions the outlet-side space 12*e* into a first outlet-side space, which is communicated with the first passage hole 141*a*, and a second outlet-side space, which is communicated with the second passage hole 142*a*. This partition portion is formed to extend across the outlet-side space 12*e* in the radial direction DRr.

The main-body cover 124 is a lid member that covers the opening 120*a* of the main body 120. The main-body cover 124 has a plate portion 124*a*, a cover rib portion 124*b*, a boss 124*c*, a cover peripheral wall 124*d* and a plurality of cover attachment portions 124*e*. The main-body cover 124 is formed integrally in one-piece as an integral molded product.

The plate portion 124*a* is shaped in a circular ring form that extends in the radial direction DRr. The plate portion 124*a* cooperates with the peripheral wall 122 and the stationary valve element 14 to form the inlet-side space 12*d*. The cover rib portion 124*b* is a portion of the main-body cover 124 which is inserted into the opening 120*a* of the main body 120.

The boss 124*c* is a portion through which the shaft 18 is inserted, and the boss 124*c* rotatably supports the shaft 18. The boss 124*c* projects from the plate portion 124*a* toward the one side in the axial direction DRa. A shaft seal 124*h*, which seals a gap between the boss 124*c* and the shaft 18, is installed at the inside of the boss 124*c*, and an O-ring 124*k*, which seals a gap between the boss 124*c* and the drive device 16, is installed at the outside of the boss 124*c*.

The cover peripheral wall 124*d* is shaped in a tubular form and is located on the radially outer side of the boss 124*c*. The drive device 16 is inserted between an outer periphery of the boss 124*c* and an inner periphery of the cover peripheral wall 124*d*.

Each of the cover attachment portions 124*e* is opposed to a corresponding one of the main-body attachment portions 122*m* and receives a corresponding one of the fastening members TN which fastens between the main body 120 and the main-body cover 124. Each of the cover attachment portions 124*e* projects outward from an outer periphery of the cover peripheral wall 124*d* in the radial direction DRr.

The stationary valve element 14 is a member which is shaped in a circular disk form (i.e., a disk valve form) and has a thickness direction that coincides with the axial direction DRa. The stationary valve element 14 serves as a first valve element. The stationary valve element 14 has a sliding surface 140 along which a drive valve element 22 slides. The sliding surface 140 is a contact surface which contacts a sliding surface 220 of the drive valve element 22 described later and is perpendicular to the shaft central axis CL. The stationary valve element 14 is placed in the inlet-side space 12*d*.

The stationary valve element 14 is made of a material that has a smaller linear expansion coefficient and has superior wear resistance than the material of the housing 12. The stationary valve element 14 is made of a high-hardness material that is harder than the material of the housing 12. Specifically, the stationary valve element 14 is made of ceramic. The stationary valve element 14 may be a powder molded product that is formed by molding ceramic powder into a desired shape with a press machine.

As shown in FIG. 5, the stationary valve element 14 has the outlet surface 149, a first flow passage inner peripheral surface 141 and a second flow passage inner peripheral surface 142. The outlet surface 149 is opposite to the sliding surface 140 and is opposed to the outlet-side space 12*e*. The first flow passage inner peripheral surface 141 surrounds the first passage hole 141*a* through which the fluid flows. The second flow passage inner peripheral surface 142 surrounds the second passage hole 142*a*. Furthermore, the stationary valve element 14 has an outer peripheral surface 144 and a rotation stop projection 145. The outer peripheral surface 144 is opposed to the peripheral wall 122. The rotation stop projection 145 projects toward the peripheral wall 122. The rotation stop projection 145 is fitted into a receiving groove (not shown) formed at the peripheral wall 122 to limit rotation of the stationary valve element 14 relative to the housing 12.

Each of the first passage hole 141*a* and the second passage hole 142*a* is formed at a location that is spaced from the shaft central axis CL of the shaft 18. Each of the first passage hole 141*a* and the second passage hole 142*a* serves as a communication passage that communicates between the inlet-side space 12*d* and the outlet-side space 12*e*.

Specifically, the first passage hole 141*a* is formed at a portion of the stationary valve element 14, which corresponds to the first outlet-side space, such that the first passage hole 141*a* is communicated with the first outlet-side space. Furthermore, the second passage hole 142*a* is formed at a portion of the stationary valve element 14, which corresponds to the second outlet-side space, such that the second passage hole 142*a* is communicated with the second outlet-side space.

A central inner peripheral surface 146 is formed at a generally center portion of the stationary valve element 14. The central inner peripheral surface 146 is a wall surface that surrounds a shaft insertion hole through which the shaft 18 is inserted. An inner diameter of the central inner peripheral surface 146 is larger than a diameter of the shaft 18, so that the shaft 18 does not slide relative to the central inner peripheral surface 146. The inner diameter of the central inner peripheral surface 146 increases in a stepwise manner from the one side toward the other side in the axial direction DRa. However, the inner diameter of the central inner peripheral surface 146 may be kept constant from the one side to the other side in the axial direction DRa. Alternatively, the inner diameter of the central inner peripheral surface 146 may decrease from the one side toward the other side in a stepwise manner in the axial direction DRa. The gasket 15, which seals a gap between the stationary valve element 14 and the mounting portion 122*a*, is placed between the stationary valve element 14 and the mounting portion 122*a*.

The drive device 16 is a device that is configured to transmit a rotational force to the shaft 18. As shown in FIG. 2, the drive device 16 includes an electric motor 161, a gear arrangement 162 and a motor control circuit (motor control circuitry) 163. The electric motor 161 serves as a drive power source. The gear arrangement 162 serves as a drive force transmission member and transmits the output of the electric motor 161 to the shaft 18.

The electric motor 161 is configured to drive the shaft 18 in a rotational drive range, which is between an initial rotational position and a maximum rotational position, in a forward rotational direction and a backward rotational direction which are opposite to each other. The electric motor 161 is formed by a stepping motor. The electric motor 161 is rotated according to a control signal outputted from the motor control circuit 163 that is electrically connected to the electric motor 161. The gear arrangement 162 is a speed reducer that reduces a rotational speed of the rotation outputted from the electric motor 161 and transmits the rotation of the reduced rotational speed to the shaft 18.

The motor control circuit 163 is a computer that includes: a memory, which is a non-transitory tangible storage medium; and a processor. The motor control circuit 163 executes a computer program stored in the memory and controls the electric motor 161 according to the computer program.

The shaft 18 is a rotatable column that is rotated about the predetermined shaft central axis CL by the rotational force outputted from the drive device 16. The shaft 18 extends in the axial direction DRa. Two axial sides of the shaft 18, which are opposite to each other in the axial direction DRa, are rotatably supported by the housing 12. The shaft 18 extends through the stationary valve element 14 and the drive valve element 22 and is rotatably supported by the housing 12.

The shaft 18 includes: a shaft core 181 which is made of metal; and a holder 182 which is made of resin and is coupled to the shaft core 181. The shaft core 181 and the holder 182 are coupled together to integrally rotate. The shaft core 181 has the shaft central axis CL and extends in the axial direction DRa. The shaft core 181 is a portion that serves as a rotational center of the rotor 20.

The holder 182 is coupled to one side of the shaft core 181 which faces the one side in the axial direction DRa. The holder 182 is shaped in a bottomed tubular form. The shaft core 181 is coupled to an inside of a distal end part of the holder 182 which is located on the one side in the axial direction DRa. Furthermore, the distal end part of the holder 182, which projects to the outside of the housing 12, is coupled to the gear arrangement of the drive device 16.

Figure 6:
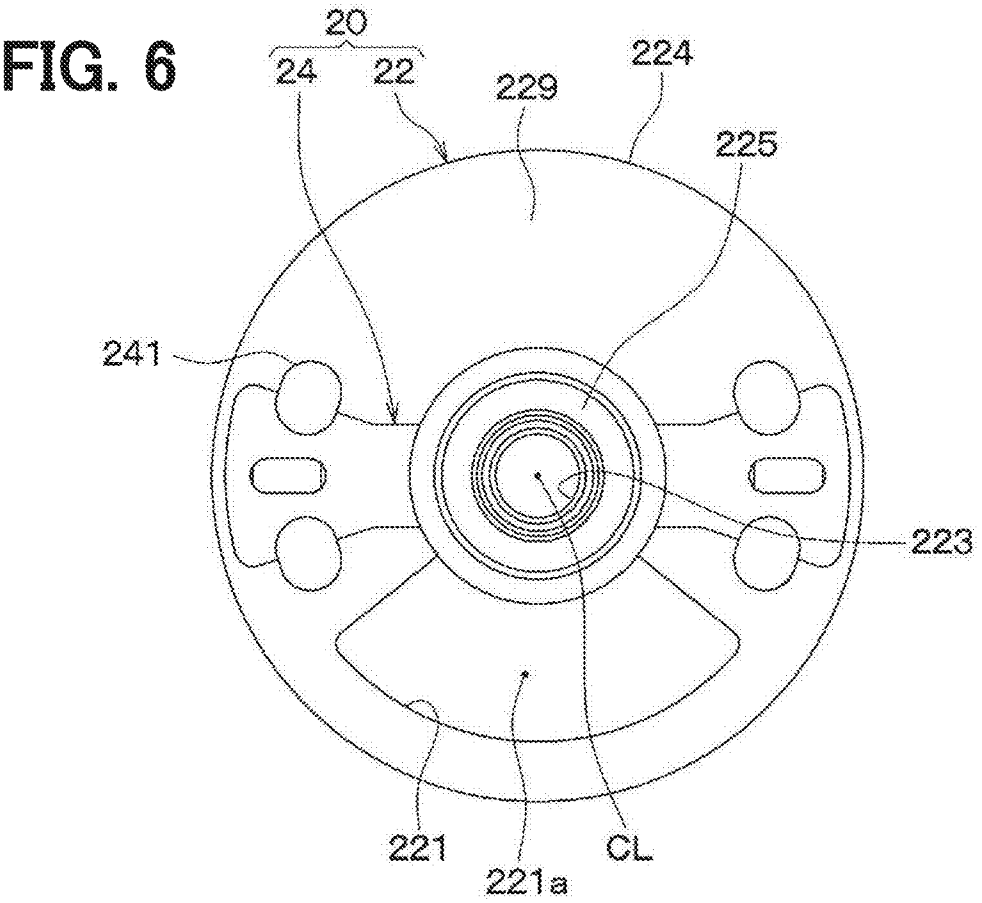
FIG. 6 is a plan view of a drive valve element alone.

The rotor 20 is rotated about the central axis CL of the shaft 18 by the output of the drive device 16. The rotor 20 increases or decreases the opening degree of each of the passage holes 141*a*, 142*a* of the stationary valve element 14 in response to the rotation of the shaft 18. As shown in FIGS. 4 and 6, the rotor 20 includes: the drive valve element 22, which serves as a valve element; and a lever 24, which couples the drive valve element 22 to the shaft 18.

The drive valve element 22 is the valve element which increases or decreases the opening degree of the first passage hole 141*a* and the opening degree of the second passage hole 142*a* in response to the rotation of the shaft 18. The drive valve element 22 is placed in the inlet-side space 12*d*. The drive valve element 22 serves as a second valve element. The drive valve element 22 is a member which is shaped in a circular disk form (i.e., a disk valve form) and has a thickness direction that coincides with the axial direction DRa. The drive valve element 22 is placed in the inlet-side space 12*d* such that the drive valve element 22 is opposed to the stationary valve element 14 in the axial direction DRa. The drive valve element 22 has the sliding surface 220 which is opposed to the sliding surface 140 of the stationary valve element 14. The sliding surface 220 is a seal surface that seals the sliding surface 140 of the stationary valve element 14. The drive valve element 22 has an inlet surface 229 which is a surface of the drive valve element 22 that is opposite to the sliding surface 220, and the inlet surface 229 is opposed to the inlet-side space 12*d*. The sliding surface 220 is perpendicular to the shaft central axis CL. The drive valve element 22 has an outer peripheral surface 224 which is opposed to the peripheral wall 122 at an outer periphery of the drive valve element 22.

The drive valve element 22 is made of a material that has a smaller coefficient of linear expansion and superior wear resistance in comparison to the material of the housing 12. The drive valve element 22 is made of a high-hardness material that is harder than the material of the housing 12. Specifically, the drive valve element 22 is made of ceramic. The drive valve element 22 may be a powder molded product that is formed by molding ceramic powder into a desired shape with a press machine.

The drive valve element 22 has a flow passage inner peripheral surface 221 which surrounds the flow passage hole 221*a* at a location that is displaced from the shaft central axis CL of the shaft 18. The flow passage hole 221*a* is a through-hole that extends through the drive valve element 22 in the axial direction DRa. The flow passage hole 221*a* is formed at a portion of the drive valve element 22 where the flow passage hole 221*a* can overlap with the first passage hole 141*a* and the second passage hole 142*a* in the axial direction DRa when the drive valve element 22 is rotated about the shaft central axis CL of the shaft 18. The drive valve element 22 is substantially coaxial with the stationary valve element 14 and the shaft 18. The drive valve element 22 has a central inner peripheral surface 223 which surrounds the shaft insertion hole that is formed generally at a center portion of the drive valve element 22 and receives the shaft 18. An inner diameter of the central inner peripheral surface 223 is larger than the diameter of the shaft 18, so that the shaft 18 does not slide relative to the central inner peripheral surface 223. The inner diameter of the central inner peripheral surface 223 increases in a stepwise manner from the one side toward the other side in the axial direction DRa. However, the inner diameter of the central inner peripheral surface 223 may be kept constant from the one side to the other side in the axial direction DRa. Alternatively, the inner diameter of the central inner peripheral surface 223 may decrease from the one side toward the other side in a stepwise manner in the axial direction DRa.

In the valve device 10, when the drive valve element 22 is rotated such that the flow passage hole 221*a* overlaps with the first passage hole 141*a* in the axial direction DRa, the first passage hole 141*a* is opened. Furthermore, in the valve device 10, when the drive valve element 22 is rotated such that the flow passage hole 221*a* overlaps with the second passage hole 142*a* in the axial direction DRa, the second passage hole 142*a* is opened.

The drive valve element 22 is configured to adjust a flow rate ratio between a flow rate of the fluid, which passes through the first passage hole 141*a*, and a flow rate of the fluid, which passes through the second passage hole 142*a*. That is, the drive valve element 22 is configured to decrease the opening degree of the second passage hole 142*a* in response to an increase in the opening degree of the first passage hole 141*a*.

The lever 24 is a coupling member that couples the drive valve element 22 to the shaft 18. The lever 24 is fixed to the drive valve element 22 and couples between the drive valve element 22 and the shaft 18 to enable integral rotation of the drive valve element 22 and the shaft 18 in a state where the drive valve element 22 is displaceable in the axial direction DRa of the shaft 18.

The compression spring 26 is an urging member that urges the rotor 20 against the stationary valve element 14. The compression spring 26 is resiliently deformed in the axial direction DRa of the shaft 18. The compression spring 26 is placed in a state where the compression spring 26 is compressed in the axial direction DRa. One end portion of the compression spring 26, which faces the one side in the axial direction DRa, contacts the shaft 18, and the other end portion of the compression spring 26, which faces the other side in the axial direction DRa, contacts the rotor 20. Specifically, the compression spring 26 is placed such that the one end portion of the compression spring 26, which faces the one side in the axial direction DRa, contacts an inside of the holder 182, and the other end portion of the compression spring 26, which faces the other side in the axial direction DRa, contacts a spring receiver 225 of the lever 24.

The compression spring 26 urges the rotor 20 against the stationary valve element 14, so that a contact state, in which the sliding surface 140 of the stationary valve element 14 and the sliding surface 220 of the drive valve element 22 contact with each other, is maintained. The shaft 18 is placed at the inside of the compression spring 26.

The first torsion spring 28 is a spring that urges the shaft 18 against the housing 12 in the circumferential direction DRc around the shaft central axis CL1 of the shaft 18. The first torsion spring 28 is placed between the housing 12 and the shaft 18.

The first torsion spring 28 is basically used in a state where the first torsion spring 28 is twisted and is resiliently deformed in the circumferential direction DRc. The urging force of the first torsion spring 28 is exerted to the shaft 18 at the time of rotating the shaft 18 and at the time of stopping the rotation of the shaft 18. The urging force of the first torsion spring 28 is transmitted as a rotational force from the gear arrangement of the drive device 16 to the electric motor 161 through the shaft 18. Therefore, by placing the first torsion spring 28 between the housing 12 and the shaft 18, rattling in the circumferential direction DRc between the drive device 16 and the shaft 18 is limited.

The second torsion spring 30 is a spring that urges the lever 24 relative to the shaft 18 in the circumferential direction DRc. The second torsion spring 30 is placed between the shaft 18 and the lever 24.

The second torsion spring 30 is placed on the drive valve element 22 side of the first torsion spring 28. One end portion of the second torsion spring 30, which faces the one side in the axial direction, is anchored to an anchoring portion (not shown) formed at the holder 182, and the other end portion of the second torsion spring 30, which faces the other side in the axial direction, is anchored to an anchoring portion 241 of the lever 24. The second torsion spring 30 urges the drive valve element 22 relative to the shaft 18 in the circumferential direction. Rattling between the shaft 18 and the drive valve element 22 in the circumferential direction DRc is limited by an urging force of the second torsion spring 30.

Next, an operation of the valve device 10 of the present embodiment will be described. As shown in FIGS. 1 to 4, in the valve device 10, the fluid flows from the inlet 12*a* into the inlet-side space 12*d*, as indicated by an arrow Fi. In a case where the first passage hole 141*a* is opened, the fluid flows from the inlet-side space 12*d* into the first outlet-side space through the flow passage hole 221*a* and the first passage hole 141*a*. The fluid, which is supplied into the first outlet-side space, flows from the first outlet-side space to the outside of the valve device 10 through the first outlet 12*b*, as indicated by an arrow F1*o*. In this case, the flow rate of the fluid, which passes through the first passage hole 141*a*, is determined according to the opening degree of the first passage hole 141*a*. That is, the flow rate of the fluid, which flows from the inlet 12*a* to the first outlet 12*b* through the first passage hole 141*a*, is increased when the opening degree of the first passage hole 141*a* is increased. Furthermore, the opening degree of the first passage hole 141*a* is increased when an overlapping area between the first passage hole 141*a* and the flow passage hole 221*a* in the axial direction DRa is increased.

In contrast, in another case where the second passage hole 142*a* is opened, the fluid flows from the inlet-side space 12*d* to the second outlet-side space through the flow passage hole 221*a* and the second passage hole 142*a*. The fluid, which is supplied into the second outlet-side space, flows from the second outlet-side space to the outside of the valve device 10 through the second outlet 12*c*, as indicated by an arrow F2*o*. In this case, the flow rate of the fluid, which passes through the second passage hole 142*a*, is determined according to the opening degree of the second passage hole 142*a*. That is, the flow rate of the fluid, which flows from the inlet 12*a* to the second outlet 12*c* through the second passage hole 142*a*, is increased when the opening degree of the second passage hole 142*a* is increased. Furthermore, the opening degree of the second passage hole 142*a* is increased when an overlapping area between the second passage hole 142*a* and the flow passage hole 221*a* in the axial direction DRa is increased.

The arrangement of the valve device 10 in the coolant circuit is, for example, as follows. That is, a heat exchanger Ei is placed on an upstream side of the inlet 12*a*, and a heat exchanger E1*o* is placed on a downstream side of the first outlet 12*b*, and a heat exchanger E2*o* is placed on a downstream of the second outlet 12*c*.

Here, the heat exchanger Ei, the heat exchanger E1*o* and the heat exchanger E2*o* may be a chiller, a radiator and a battery heat exchanger, respectively. Alternatively, the heat exchanger Ei, the heat exchanger E1*o* and the heat exchanger E2*o* may be the chiller, the battery heat exchanger and a cooler core, respectively. Further alternatively, the heat exchanger Ei, the heat exchanger E1*o* and the heat exchanger E2*o* may be a coolant-cooled condenser, the battery heat exchanger and a heater core, respectively. Further alternatively, the heat exchanger Ei, the heat exchanger E1*o* and the heat exchanger E2*o* may be the radiator, the chiller and the coolant-cooled condenser, respectively.

The chiller is a heat exchanger that cools the water-based coolant by a refrigeration cycle (not shown). The coolant-cooled condenser is a heat exchanger that heats the water-based coolant by the refrigeration cycle. The radiator is a heat exchanger that releases the thermal energy of the hot or cold water-based coolant to the outside of the vehicle. The battery heat exchanger is a heat exchanger that heats or cools a battery, which generates a drive force for driving the vehicle, with the water-based coolant. The cooler core is a heat exchanger that cools the air, which is blown into the cabin, with the water-based coolant. The heater core is a heat exchanger that heats the air, which is blown into the cabin, with the water-based coolant.

The electric motor 161 is controlled by the motor control circuit 163 to change its rotational position in a stepwise manner through multiple steps (e.g., 100 steps), which is equal to or more than 10 steps, within a range that is from an initial rotational position to a maximum rotational position of the electric motor 161. Thereby, the opening degree (i.e., a degree of opening) of each of the first passage hole 141*a* and the second passage hole 142*a* is adjusted in a stepwise manner through multiple steps (e.g., dozens of steps) which is equal to or more than four steps from the closed position thereof to the full opening position thereof. This operation is made possible by using the stepping motor as the electric motor 161.

Hereinafter, the structures of the stationary valve element 14 and the drive valve element 22 will be further described. A surface of the stationary valve element 14 has the sliding surface 140, the outlet surface 149, the outer peripheral surface 144, the first flow passage inner peripheral surface 141, the second flow passage inner peripheral surface 142 and the central inner peripheral surface 146 described above. The sliding surface 140 serves as a first sliding surface, and the outlet surface 149 serves as a surface that is opposite to the first sliding surface. Each of the outer peripheral surface 144, the first flow passage inner peripheral surface 141, the second flow passage inner peripheral surface 142 and the central inner peripheral surface 146 serves as a peripheral surface that is located between the sliding surface 140 and the outlet surface 149.

Furthermore, a surface of the drive valve element 22 has the sliding surface 220, the inlet surface 229, the outer peripheral surface 224, the flow passage inner peripheral surface 221 and the central inner peripheral surface 223 described above. The sliding surface 220 serves as a second sliding surface, and the inlet surface 229 serves as a surface that is opposite to the second sliding surface. Each of the outer peripheral surface 224, the flow passage inner peripheral surface 221 and the central inner peripheral surface 223 serves as a peripheral surface that is located between the sliding surface 220 and the inlet surface 229. Since the stationary valve element 14 and the drive valve element 22 slide relative to each other through the sliding movement between the sliding surface 220 and the sliding surface 140, the sliding surface 220 and the sliding surface 140 are parallel to each other.

Furthermore, as shown in FIG. 4, an outer diameter of the sliding surface 140 is larger than an outer diameter of the sliding surface 220. In fact, when a central axis of the shaft insertion hole of the stationary valve element 14 is coaxially placed relative to a central axis of the shaft insertion hole of the drive valve element 22, an outer peripheral edge of the sliding surface 140 is located on a radially outer side of an outer peripheral edge of the sliding surface 220 in the radial direction DRr.

Furthermore, as described above, the inner diameter of the central inner peripheral surface 146 and the inner diameter of the central inner peripheral surface 223 are larger than the diameter of the shaft core 181 of the shaft 18. Therefore, a gap is formed between the central inner peripheral surface 146 and the shaft core 181. Also, a gap is formed between the central inner peripheral surface 223 and the shaft core 181.

Figure 7:
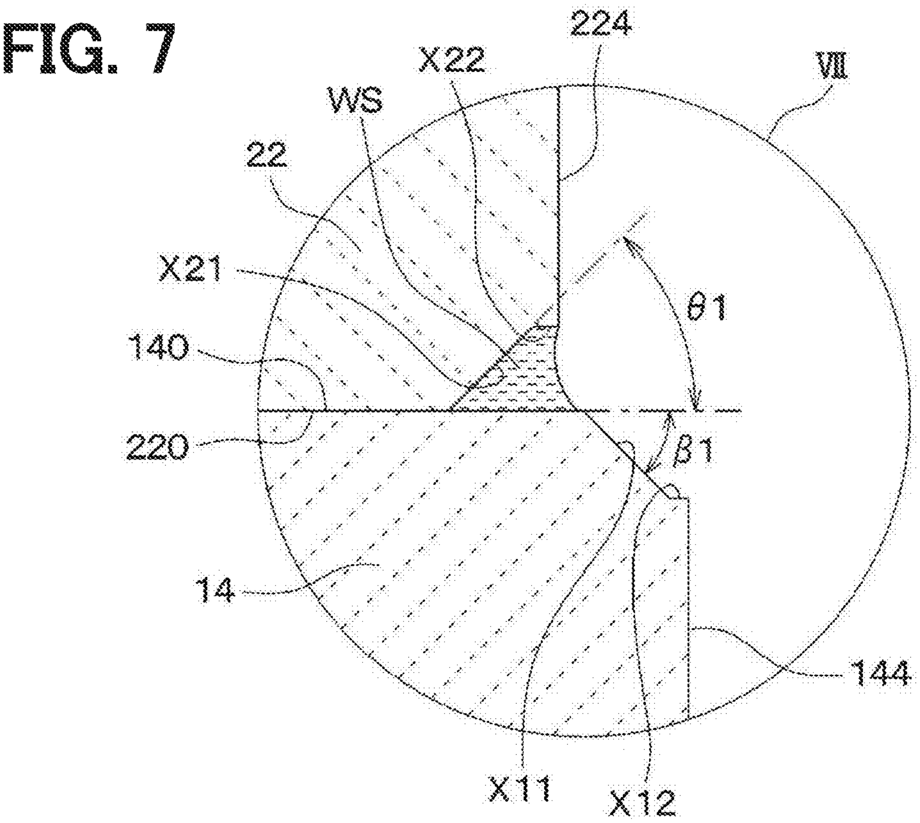
FIG. 7 is an enlarged view of a section VII of FIG. 4.

As shown in FIG. 7, at the drive valve element 22, a sloped surface X21 and an auxiliary surface X22 are formed between the outer peripheral surface 224 and the sliding surface 220. The sloped surface X21 and the auxiliary surface X22 may be formed all around the drive valve element 22 about the shaft central axis CL in the circumferential direction or may be only partially formed along a part(s) of the drive valve element 22 about the shaft central axis CL in the circumferential direction.

The sloped surface X21 and the auxiliary surface X22 are formed as a chamfer (i.e., a cut on an edge or corner). Specifically, the sloped surface X21 and the auxiliary surface X22 are shaped to limit formation of a sharp joint (e.g., a 90 degree sharp corner) between the sliding surface 220 and the outer peripheral surface 224.

The sloped surface X21 is joined to an edge portion (i.e., an outer peripheral end) of the sliding surface 220, which is placed on the outer peripheral surface 224 side, and the sloped surface X21 is sloped by an acute angle relative to the sliding surface 140. That is, a slope angle θ1 of the sloped surface X21 relative to the sliding surface 140 is larger than 0° and is smaller than 90°. Here, the slope angle θ1 refers to a slope angle defined in a gap (i.e., an empty side where the wall is absent) between the drive valve element 22 and the stationary valve element 14. This is equally applied to all of slope angles described later. Therefore, when the slope angle θ1 of the sloped surface X21 relative to the sliding surface 140 is the acute angle, it means that an angle of a corner of the drive valve element 22, which is formed between the sliding surface 220 and the sloped surface X21, is an obtuse angle.

The significance of this setting will be explained below. In order to achieve highly accurate flow rate control in the valve device 10, it is desirable to reduce a sliding torque generated between the sliding surface 140 and the sliding surface 220. Furthermore, when the water-based coolant is drained out from the valve device 10 at the time of replacing the component(s) of the valve device 10, the inside of the valve device 10 is likely to become a dry state. When the inside of the valve device 10 is dried out, calcium and silica, which are residues in the fluid, may be deposited (i.e., solidified) as a scale and adhere between the sliding surface 140 and the sliding surface 220. This phenomenon may possibly interfere with the sliding movement between the sliding surface 140 and the sliding surface 220.

In contrast, when the sloped surface X21, which is joined to the edge portion of the sliding surface 220 placed on the outer peripheral surface 224 side, is sloped by the acute angle relative to the sliding surface 140, a puddle WS of the water-based coolant is easily formed by a surface tension in the space between the sloping surface X21 and the sliding surface 140 even after the draining out of the water-based coolant. This is because the sloped surface X21 is exposed to the inlet-side space 12*d* during the use of the valve device 10, and thereby, the area around the sloped surface X21 is exposed to the water-based coolant.

This puddle WS guards the area around the edge portion of the sliding surface 220 which is placed on the outer peripheral surface 224 side. Therefore, the solidification of the residual components between the sliding surface 140 and the sliding surface 220 is less likely to occur. Thereby, the possibility of interfering with the sliding movement between the stationary valve element 14 and the drive valve element 22 is reduced.

One end of the auxiliary surface X22 is joined to an edge portion of the sloped surface X21 which is opposite to the sliding surface 220, and the other end of the auxiliary surface X22 is joined to the outer peripheral surface 224. A slope angle of the auxiliary surface X22 relative to the sliding surface 140 is smaller than the slope angle of the sloped surface X21 relative to the sliding surface 140. For example, this slope angle of the auxiliary surface X22 may be 0°.

With the above-described configuration, a volume of the puddle WS can be made larger in comparison to a case where the auxiliary surface X22 is absent, and thereby, it is possible to delay the evaporation of the puddle WS. Furthermore, a size of an opening of the gap, which is formed between: the sloped surface X21 and the auxiliary surface X22; and the sliding surface 140, becomes smaller, and thereby, it is possible to delay the evaporation of the puddle WS formed in this gap.

Furthermore, as shown in FIG. 7, at the stationary valve element 14, a sloped surface X11 and an auxiliary surface X12 are formed between the outer peripheral surface 144 and the sliding surface 140. The sloped surface X11 and the auxiliary surface X12 may be formed all around the stationary valve element 14 about the shaft central axis CL in the circumferential direction or may be only partially formed along a part(s) of the stationary valve element 14 about the shaft central axis CL in the circumferential direction.

The sloped surface X11 and the auxiliary surface X12 are formed as a chamfer. Specifically, the sloped surface X11 and the auxiliary surface X12 are shaped to limit formation of a sharp joint between the sliding surface 140 and the outer peripheral surface 144.

The sloped surface X11 is joined to an edge portion (i.e., an outer peripheral end) of the sliding surface 140, which is placed on the outer peripheral surface 144 side, and the sloped surface X11 is sloped by an acute angle relative to the sliding surface 220. That is, a slope angle β1 of the sloped surface X11 relative to the sliding surface 220 is larger than 0° and is smaller than 90°.

One end of the auxiliary surface X12 is joined to an edge portion of the sloped surface X11 which is opposite to the sliding surface 140, and the other end of the auxiliary surface X12 is joined to the outer peripheral surface 144. A slope angle of the auxiliary surface X12 relative to the sliding surface 220 is smaller than the slope angle of the sloped surface X11 relative to the sliding surface 220. For example, this slope angle of the auxiliary surface X12 may be 0°.

Figure 8:
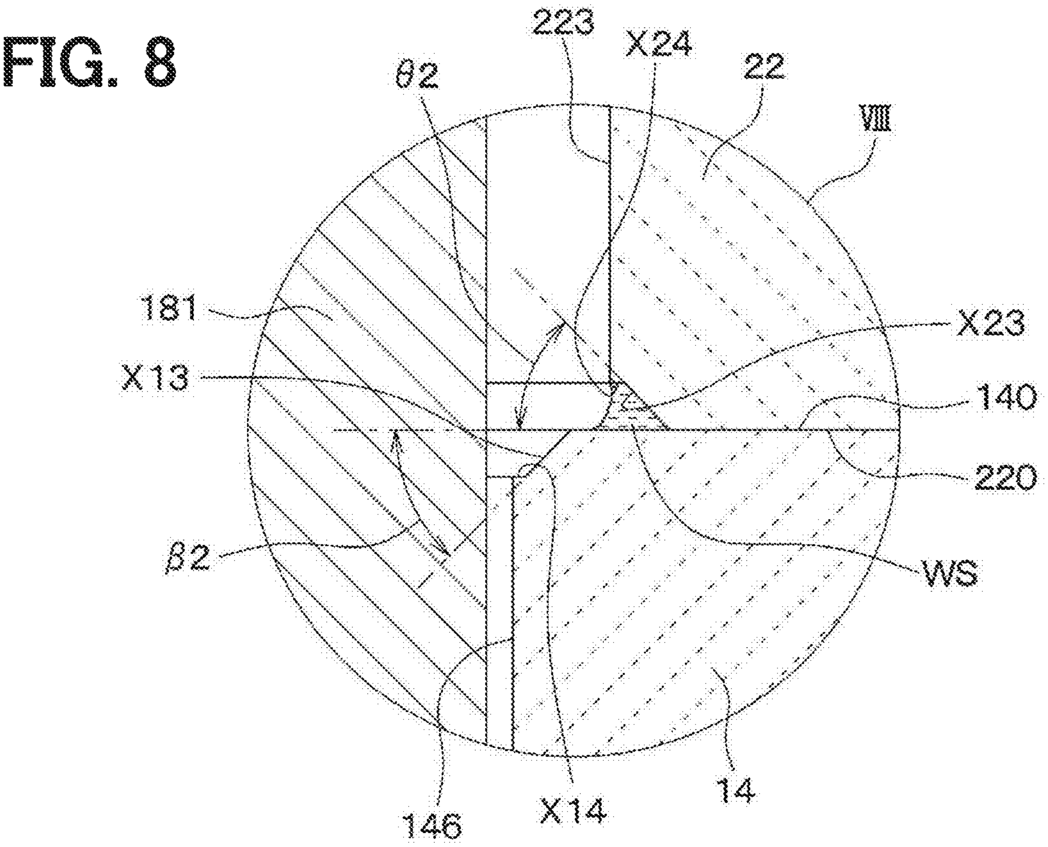
FIG. 8 is an enlarged view of a section VIII of FIG. 4.

Furthermore, as shown in FIG. 8, at the drive valve element 22, a sloped surface X23 and an auxiliary surface X24 are formed between the central inner peripheral surface 223, which is opposed to the shaft core 181, and the sliding surface 220. The sloped surface X23 and the auxiliary surface X24 may be formed all around the drive valve element 22 about the shaft central axis CL in the circumferential direction or may be only partially formed along a part(s) of the drive valve element 22 about the shaft central axis CL in the circumferential direction.

The sloped surface X23 and the auxiliary surface X24 are formed as a chamfer. Specifically, the sloped surface X23 and the auxiliary surface X24 are shaped to limit formation of a sharp corner that joins between the sliding surface 220 and the central inner peripheral surface 223.

The sloped surface X23 is joined to an edge portion of the sliding surface 220, which is placed on the central inner peripheral surface 223 side, and the sloped surface X23 is sloped by an acute angle relative to the sliding surface 140. That is, a slope angle θ2 of the sloped surface X23 relative to the sliding surface 140 is larger than 0° and is smaller than 90°.

As described above, when the sloped surface X23, which is joined to the edge portion of the sliding surface 220 placed on the central inner peripheral surface 223 side, is sloped by the acute angle relative to the sliding surface 140, a puddle WS of the water-based coolant can be easily formed by the surface tension in the space between the sloped surface X23 and the sliding surface 140 even after the draining out of the water-based coolant. This is because the gap is present between the shaft core 181 and the central inner peripheral surface 223 at the time of using the valve device 10, and thereby, an area around the sloped surface X23 is exposed to the water-based coolant.

This puddle WS guards the area around the edge portion of the sliding surface 220 which is placed on the central inner peripheral surface 223 side. Therefore, the solidification of the residual components between the sliding surface 140 and the sliding surface 220 is less likely to occur. Thereby, the possibility of interfering with the sliding movement between the stationary valve element 14 and the drive valve element 22 is reduced.

One end of the auxiliary surface X24 is joined to an edge portion of the sloped surface X23 which is opposite to the sliding surface 220, and the other end of the auxiliary surface X24 is joined to the central inner peripheral surface 223. A slope angle of the auxiliary surface X24 relative to the sliding surface 140 is smaller than the slope angle of the sloped surface X23 relative to the sliding surface 140. For example, this slope angle of the auxiliary surface X24 may be 0°. With the above-described configuration, a volume of the puddle WS can be made larger in comparison to a case where the auxiliary surface X24 is absent, and thereby, it is possible to delay the evaporation of the puddle WS. Furthermore, since a size of an opening of the gap, which is formed between: the sloped surface X23 and the auxiliary surface X24; and the sliding surface 140, is reduced, it is possible to delay the evaporation of the puddle WS formed in this gap.

Furthermore, as shown in FIG. 8, at the stationary valve element 14, a sloped surface X13 and an auxiliary surface X14 are formed between the central inner peripheral surface 146, which is opposed to the shaft core 181, and the sliding surface 140. The sloped surface X13 and the auxiliary surface X14 may be formed all around the stationary valve element 14 about the shaft central axis CL in the circumferential direction or may be only partially formed along a part(s) of the stationary valve element 14 about the shaft central axis CL in the circumferential direction.

The sloped surface X13 and the auxiliary surface X14 are formed as a chamfer. Specifically, the sloped surface X13 and the auxiliary surface X14 are shaped to limit formation of a sharp joint between the sliding surface 140 and the central inner peripheral surface 146.

The sloped surface X13 is joined to an edge portion of the sliding surface 140, which is placed on the central inner peripheral surface 146 side, and the sloped surface X13 is sloped by an acute angle relative to the sliding surface 220. That is, a slope angle β2 of the sloped surface X13 relative to the sliding surface 220 is larger than 0° and is smaller than 90°.

One end of the auxiliary surface X14 is joined to an edge portion of the sloped surface X13 which is opposite to the sliding surface 140, and the other end of the auxiliary surface X14 is joined to the central inner peripheral surface 146. A slope angle of the auxiliary surface X14 relative to the sliding surface 220 is smaller than the slope angle of the sloped surface X13 relative to the sliding surface 220. For example, this slope angle of the auxiliary surface X14 may be 0°.

Figure 9:
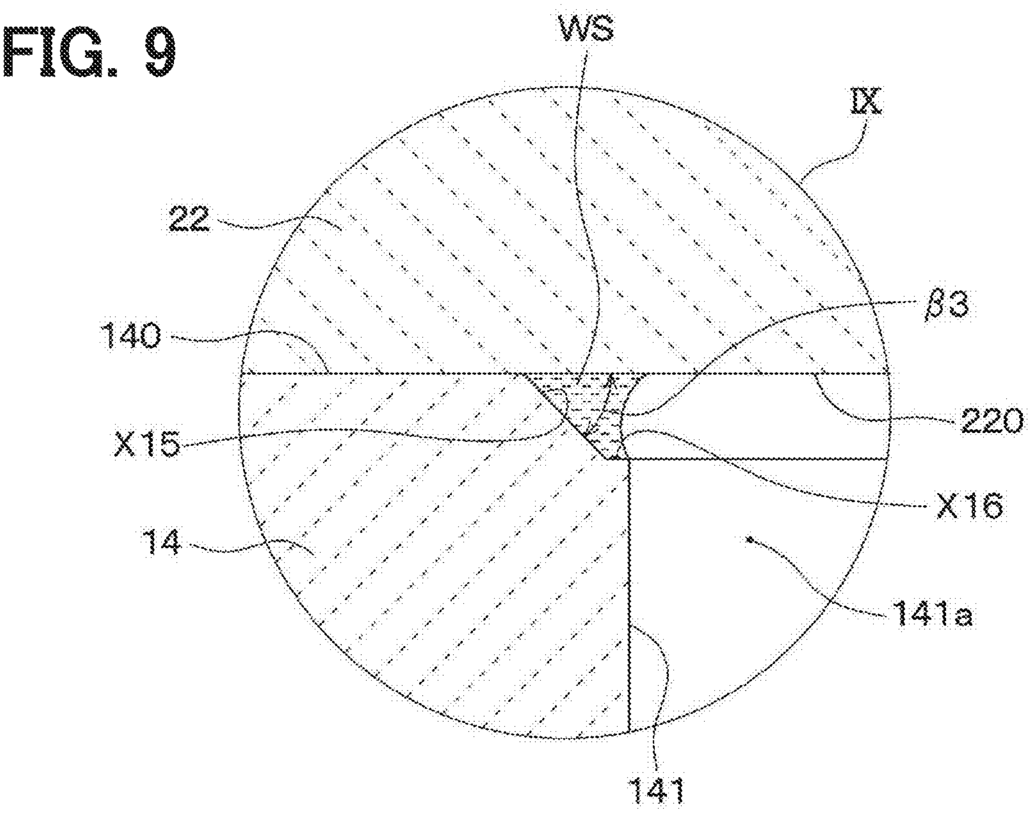
FIG. 9 is an enlarged view of a section IX of FIG. 4.

Furthermore, as shown in FIG. 9, at the stationary valve element 14, a sloped surface X15 and an auxiliary surface X16 are formed between the first flow passage inner peripheral surface 141, which is opposed to the first passage hole 141*a*, and the sliding surface 140. The sloped surface X15 and the auxiliary surface X16 may be formed all around the stationary valve element 14 about the first passage hole 141*a* in the circumferential direction or may be only partially formed along a part(s) of the stationary valve element 14 about the first passage hole 141*a* in the circumferential direction.

The sloped surface X15 and the auxiliary surface X16 are formed as a chamfer. Specifically, the sloped surface X15 and the auxiliary surface X16 are shaped to limit formation of a sharp joint between the sliding surface 140 and the first flow passage inner peripheral surface 141.

The sloped surface X15 is joined to an edge portion of the sliding surface 140, which is placed on the first flow passage inner peripheral surface 141 side, and the sloped surface X15 is sloped by an acute angle relative to the sliding surface 220. That is, a slope angle β3 of the sloped surface X15 relative to the sliding surface 220 is larger than 0° and is smaller 90°.

As described above, when the sloped surface X15, which is joined to the edge portion of the sliding surface 140 placed on the first flow passage inner peripheral surface 141 side, is sloped by the acute angle relative to the sliding surface 220, a puddle WS of the water-based coolant can be easily formed by the surface tension in the space between the sloped surface X15 and the sliding surface 220 even after the draining out of the water-based coolant. This is because the sloped surface X15 is exposed to the first passage hole 141*a* during the use of the valve device 10, and thereby, the area around the sloped surface X15 is exposed to the water-based coolant.

This puddle WS guards the area around the edge portion of the sliding surface 140 which is placed on the first flow passage inner peripheral surface 141 side. Therefore, the solidification of the residual components between the sliding surface 140 and the sliding surface 220 is less likely to occur. Thereby, the possibility of interfering with the sliding movement between the stationary valve element 14 and the drive valve element 22 is reduced.

One end of the auxiliary surface X16 is joined to an edge portion of the sloped surface X15 which is opposite to the sliding surface 140, and the other end of the auxiliary surface X16 is joined to the first flow passage inner peripheral surface 141. A slope angle of the auxiliary surface X16 relative to the sliding surface 220 is smaller than the slope angle of the sloped surface X15 relative to the sliding surface 220. For example, this slope angle of the auxiliary surface X16 may be 0°.

With the above-described configuration, a volume of the puddle WS can be made larger in comparison to a case where the auxiliary surface X16 is absent, and thereby, it is possible to delay the evaporation of the puddle WS. Furthermore, since a size of an opening of the gap, which is formed between: the sloped surface X15 and the auxiliary surface X16; and the sliding surface 220, is reduced, it is possible to delay the evaporation of the puddle WS formed in this gap.

Furthermore, at the stationary valve element 14, a sloped surface and an auxiliary surface, which are similar to the sloped surface X15 and the auxiliary surface X16, may be formed between the second flow passage inner peripheral surface 142, which is opposed to the second passage hole 142*a*, and the sliding surface 140. With this configuration, there is formed the puddle of the water-based coolant that implements the advantages, which are similar to the above-described advantages.

Furthermore, at the drive valve element 22, a sloped surface and an auxiliary surface, which are similar to the sloped surface X15 and the auxiliary surface X16, may be formed between the flow passage inner peripheral surface 221, which is opposed to the flow passage hole 221*a*, and the sliding surface 220. With this configuration, there is formed the puddle of the water-based coolant that implements the advantages, which are similar to the above-described advantages.

Figure 10:
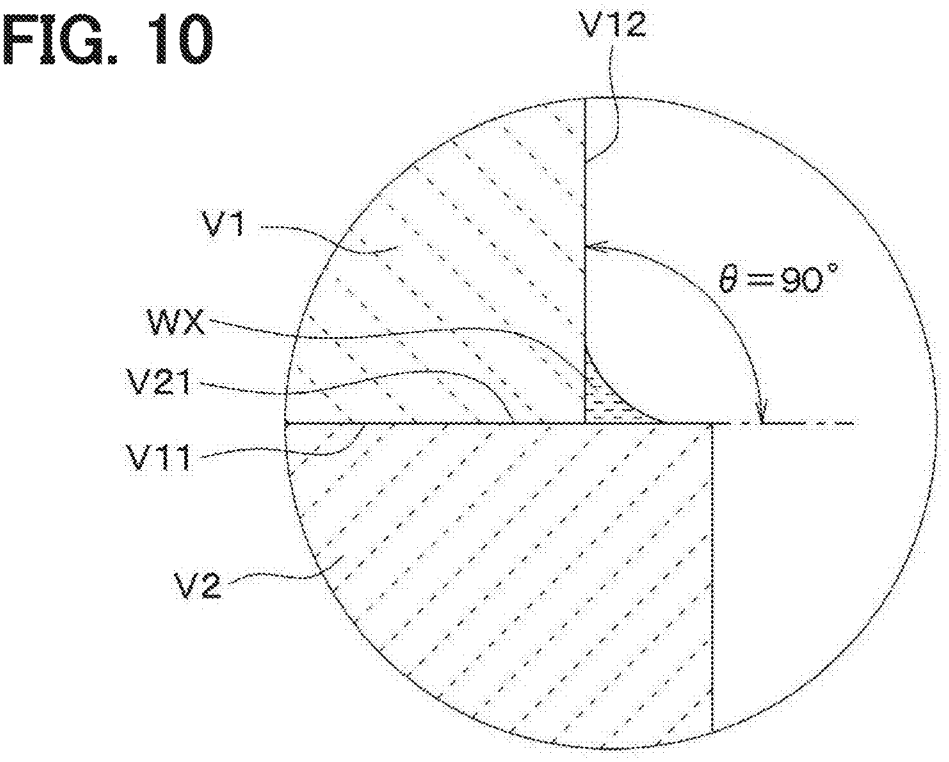
FIG. 10 is a partial enlarged cross-sectional view of a comparative example.

Hereinafter, a comparative example will be described with reference to FIG. 10. At a valve device shown in FIG. 10, a sliding surface V11 of a valve element V1 and a sliding surface V21 of a valve element V2 slide relative to each other. A chamfer does not exist between a peripheral surface V12 of the valve element V1 and the sliding surface V11, and a 90 degree sharp corner joins between the peripheral surface V12 and the sliding surface V11. In such a case, even when a puddle WX is formed after the water-based coolant is drained out, a volume of the puddle WX is small and can be easily evaporated.

Figure 11:
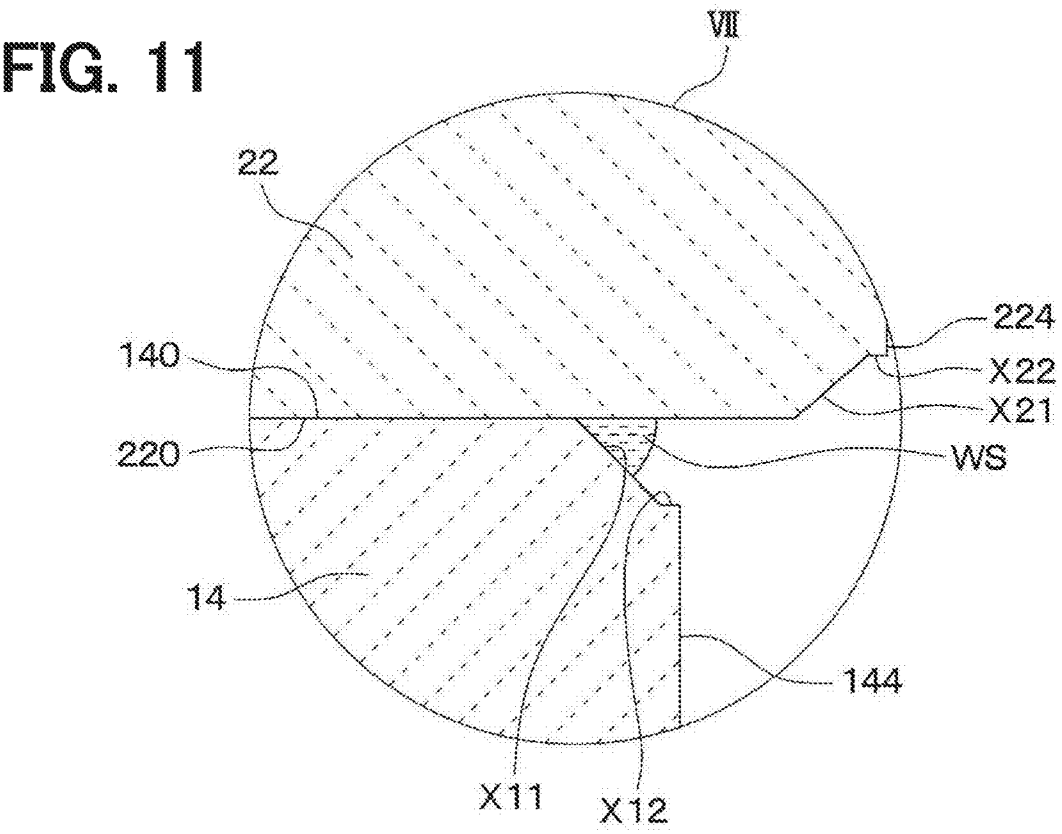
FIG. 11 is an enlarged view of the section VII at a time of occurrence of positional deviation between the valve elements.

Now, the present embodiment will be further described. As described above, the gap is formed between the central inner peripheral surface 146 and the shaft core 181 and also between the central inner peripheral surface 223 and the shaft core 181. Therefore, a position of the stationary valve element 14 and a position of the drive valve element 22 relative to the shaft core 181 may possibly be changed. For example, in a normal case, as shown in FIGS. 4 and 7, the outer peripheral surface 144 of the stationary valve element 14 protrudes outward in the radial direction DRr relative to the outer peripheral surface 224 of the drive valve element 22. However, as shown in FIG. 11, in some cases, a positional deviation may possibly occur at the stationary valve element 14 and/or the drive valve element 22 to cause the outer peripheral surface 224 to protrude outwardly in the radial direction DRr relative to the outer peripheral surface 144.

The following discussion is made for a case where the valve device 10 is stopped in the state, in which the above-described positional deviation is made, and the water-based coolant is drained out. In this case, as shown in FIG. 11, when the sloped surface X11, which is joined to the edge portion of the sliding surface 140 placed on the outer peripheral surface 144 side, is sloped by the acute angle relative to the sliding surface 220, the puddle WS of the water-based coolant can be easily formed by the surface tension in the space between the sloped surface X11 and the sliding surface 220 even after the draining out of the water-based coolant.

This puddle WS guards the area around the edge portion of the sliding surface 140 which is placed on the outer peripheral surface 144 side. Even in the case where the water-based coolant is drained out in the state, in which the positional deviation is made, the solidification of the residual components between the sliding surface 140 and the sliding surface 220 is less likely to occur. In this way, the possibility of interference with the sliding movement between the stationary valve element 14 and the drive valve element 22 is reduced.

As described above, since the slope angle of the auxiliary surface X12 relative to the sliding surface 220 is smaller than the slope angle of the sloped surface X11 relative to the sliding surface 220, the volume of the puddle WS can be made larger in comparison to the case where the auxiliary surface X12 is absent, and thereby, it is possible to delay the evaporation of the puddle WS. Furthermore, since a size of an opening of a gap, which is formed between: the sloped surface X11 and the auxiliary surface X12; and the sliding surface 220, is reduced, it is possible to delay the evaporation of the puddle WS formed in this gap.

This is also true for the central inner peripheral surfaces 146, 223. Specifically, as in the case of FIG. 8, there is the case where the central inner peripheral surface 146 protrudes inward in the radial direction DRr relative to the central inner peripheral surface 223. Alternatively, although not depicted in the drawing, there may be another case where the positional deviation occurs, and thereby, the central inner peripheral surface 223 protrudes inward in the radial direction DRr relative to the central inner peripheral surface 146.

The following discussion is made for a case where the valve device 10 is stopped in the state, in which the above-described positional deviation is made, and the water-based coolant is drained out. In this case, when the sloped surface X13, which is joined to the edge portion of the sliding surface 140 placed on the central inner peripheral surface 146 side, is sloped by the acute angle relative to the sliding surface 220, a puddle WS of the water-based coolant can be easily formed by the surface tension in the space between the sloped surface X13 and the sliding surface 220 even after the draining out of the water-based coolant.

This puddle WS guards the area around the edge portion of the sliding surface 140 which is placed on the central inner peripheral surface 146 side. Even in the case where the water-based coolant is drained out in the state, in which the positional deviation is made, the solidification of the residual components between the sliding surface 140 and the sliding surface 220 is less likely to occur. In this way, the possibility of interference with the sliding movement between the stationary valve element 14 and the drive valve element 22 is reduced.

As described above, since the slope angle of the auxiliary surface X14 relative to the sliding surface 220 is smaller than the slope angle of the sloped surface X13 relative to the sliding surface 220, the volume of the puddle WS can be made larger in comparison to the case where the auxiliary surface X14 is absent, and thereby, it is possible to delay the evaporation of the puddle WS. Furthermore, since a size of an opening of the gap, which is formed between: the sloped surface X13 and the auxiliary surface X14; and the sliding surface 220, is reduced, it is possible to delay the evaporation of the puddle WS formed in this gap.

In the present embodiment, any one or two of the chamfer between the sliding surface 220 and the outer peripheral surface 224, the chamfer between the sliding surface 220 and the central inner peripheral surface 223, and the chamfer between the sliding surface 140 and the first flow passage inner peripheral surface 141 may not be formed. Furthermore, the chamfer between the sliding surface 140 and the outer peripheral surface 144, and the chamfer between the sliding surface 140 and the central inner peripheral surface 146 may not be formed. Alternatively, as long as at least one of these five chamfers is formed, the possibility of interfering with the sliding movement between the stationary valve element 14 and the drive valve element 22 can be advantageously reduced.

Furthermore, in the present embodiment, the sloped surfaces X11, X13, X15, X21, X23 and the auxiliary surfaces X14, X16, X22, X24, X12 are all formed as the planar surfaces. However, in another example, the sloped surfaces X11, X13, X15, X21, X23 and the auxiliary surfaces X14, X16, X22, X24, X12 are not necessarily the planar surfaces.

As described above, the edge portion of at least one sliding surface among the sliding surfaces 140, 220 is joined to the corresponding sloped surface X21, X23, X11, X13, X15 which is sloped by the acute angle relative to the mating sliding surface that is another sliding surface among the sliding surfaces 140, 220. In this way, when the water-based coolant is drained out from the valve device 10, the puddle of the water-based coolant is likely formed by the surface tension between the sloped surface and the mating sliding surface. This makes it difficult for the solidification of the residual components to occur between the sliding surfaces 140, 220. In this way, the possibility of interference with the sliding movement between the stationary valve element 14 and the drive valve element 22 is reduced.

(1) Furthermore, the sloped surfaces X11, X13, X15, X21, X23 are the chamfers. In this way, a properly sloped surface can be formed.

(2) Furthermore, the valve device 10 includes the drive device 16 which has the stepping motor that transmits the rotational force to the shaft 18. In the case where the accurate flow rate control is executed with the stepping motor, it is more important to reduce the solidification of the residual water-based coolant.

(3) Furthermore, each of the stationary valve element 14 and the drive valve element 22 is shaped in the disk valve form. The valve element, which is shaped in the disk valve form, can easily adjust an opening area of the valve element and is suitable for the highly precise flow rate control. Therefore, it is more important to reduce the solidification of the residual water-based coolant.

(4) The sliding surface 220 slides relative to the sliding surface 140 when the sliding surface 220 is rotated around the shaft central axis CL. Furthermore, each of the sloped surfaces X11, X21 is joined to the outer peripheral end, which is centered on the shaft central axis CL, of the corresponding one of the sliding surfaces 140, 220.

This outer peripheral end is far from the shaft central axis CL and is a location where a torque, which acts as a resistance to the rotation of the drive valve element 22, is likely to increase when the residual water-based coolant is solidified. Therefore, by reducing the solidification of the water-based coolant at this location, the possibility of interference with the sliding movement between the stationary valve element 14 and the drive valve element 22 can be further effectively reduced.

(5) Furthermore, the stationary valve element 14 and the drive valve element 22 are respectively formed to include the ceramic as the material thereof. In this way, the stationary valve element 14 and the drive valve element 22 respectively have a high degree of geometrical stability, so that the chamfer shape becomes more stable under the operating environment of the valve device 10.

(6) Furthermore, the valve device 10 is used at the vehicle, and the liquid, which is used in the valve device 10, is the water-based coolant. In this case, at the valve device 10, which regulates the flow passage of the water-based coolant for the vehicle, the water-based coolant may be drained out from the valve device 10 to renew (i.e., replace) the water-based coolant. Therefore, the countermeasure of leaving the puddle of the water-based coolant is effective.

(7) Furthermore, each of the sloped surfaces X11, X13, X15, X21, X23 is configured as follows. That is, the edge portion of this sloped surface X11, X13, X15, X21, X23, which is opposite to the associated sliding surface 140, 220, is joined to the corresponding auxiliary surface X12, X14, X16, X22, X24, while the slope angle of this corresponding auxiliary surface X12, X14, X16, X22, X24 relative to the other sliding surface 220, 140 is smaller than the slope angle of this sloped surface X11, X13, X15, X21, X23 relative to the other sliding surface 220, 140. With the above-described configuration, the volume of the puddle WS of the water-based coolant can be made larger in comparison to the case where the auxiliary surface is absent, and thereby, it is possible to delay the evaporation of the puddle WS.

(8) Furthermore, the liquid flows through the flow passage of the valve device 10, and the flow rate of the liquid is regulated by the valve device 10. This liquid includes the water. The water is not a volatile fluid and therefore does not dry out easily. Thus, the evaporation of the puddle WS can be delayed.

(9) Furthermore, the sliding surface 220, to which the sloped surfaces X21, X23 are joined, is the one of the sliding surfaces 140, 220 which has the smaller outer diameter among the sliding surfaces 140, 220. In many cases, the edge portion of the sliding surface 220 having the smaller outer diameter forms an end of the contacting surface area between the sliding surfaces 140, 220. Therefore, this configuration can reduce the possibility of interference with the sliding movement between the stationary valve element 14 and the drive valve element 22.

Second Embodiment

Figure 12:
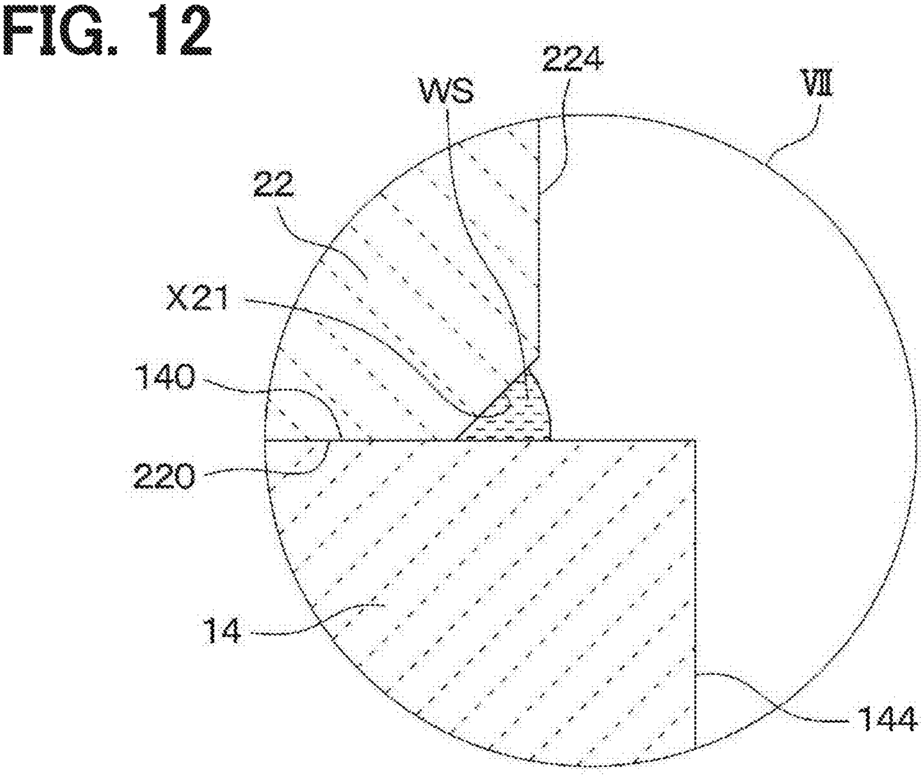
FIG. 12 is an enlarged view of the section VII according to a second embodiment.

Next, the second embodiment will be described with reference to FIG. 12. The present embodiment differs from the first embodiment with respect to the shape of the drive valve element 22. Specifically, a structure between the outer peripheral surface 224 and the sliding surface 220 of the drive valve element 22 is different from that of the first embodiment. That is, as shown in FIG. 12, the auxiliary surface X22 is eliminated from the chamfer formed between the outer peripheral surface 224 and the sliding surface 220, unlike the first embodiment.

In the present embodiment, the chamfer, which is formed between the outer peripheral surface 224 and the sliding surface 220, has the sloped surface X21. That is, a C-chamfer (i.e., a chamfer having a single chamfer plane) is formed between the outer peripheral surface 224 and the sliding surface 220. One edge portion of the sloped surface X21 is joined to an edge portion of the sliding surface 220, which is placed on the outer peripheral surface 224 side, and an opposite edge portion of the sloped surface X21, which is opposite to the one edge portion of the sloped surface X21, is joined to an edge portion of the outer peripheral surface 224 which is placed on the sliding surface 220 side. The sloped surface X21 is sloped by the acute angle relative to the sliding surface 140, like in the first embodiment. The sloped surface X21, which is configured in the above-described manner, can achieve advantages, which are similar to those achieved with the sloped surface X21 of the first embodiment.

The present embodiment differs from the first embodiment with respect to the shape of the stationary valve element 14. Specifically, unlike the first embodiment, a chamfer is not formed between the outer peripheral surface 144 and the sliding surface 140, and a 90 degree sharp corner joins between the outer peripheral surface 144 and the sliding surface 140. Alternatively, in the present embodiment, the structure between the outer peripheral surface 144 and the sliding surface 140 may be the same as that of the first embodiment.

The rest of the structure of the present embodiment is the same as that of the first embodiment. In the present embodiment, not only the auxiliary surface X22, but also one or more of the auxiliary surfaces X24, X12, X14, X16 discussed in the first embodiment may be eliminated.

Third Embodiment

Figure 13:
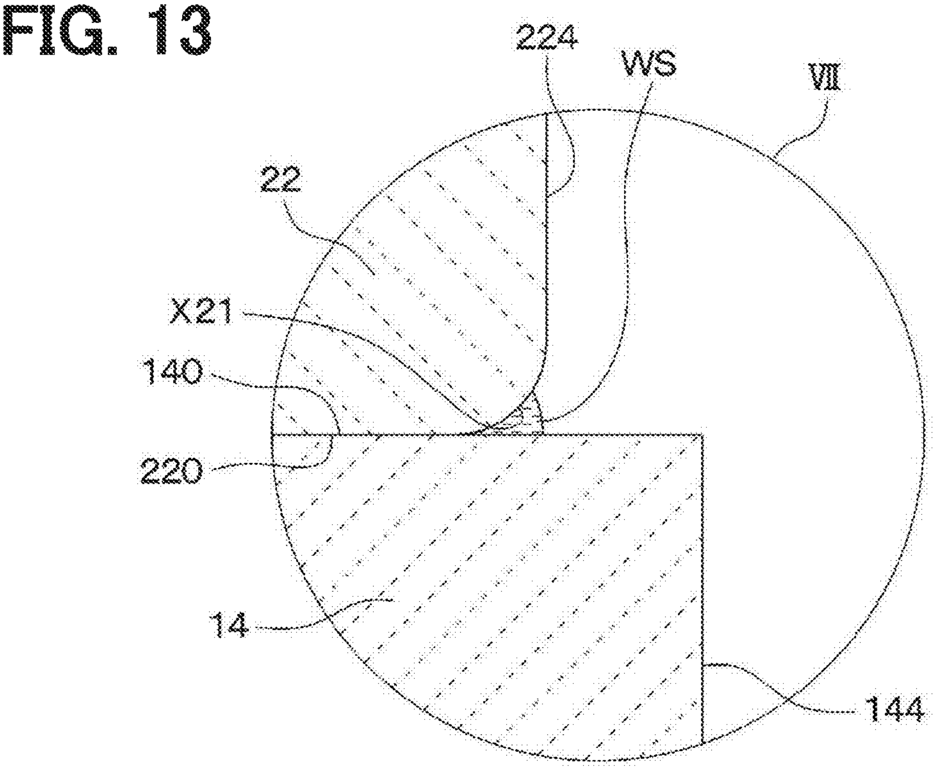
FIG. 13 is an enlarged view of the section VII according to a third embodiment.

The third embodiment will be described with reference to FIG. 13. The present embodiment is a modification of the second embodiment, in which the shape of the chamfer formed between the outer peripheral surface 224 and the sliding surface 220 is modified from that of the second embodiment.

Specifically, the sloped surface X21, which is the chamfer formed between the outer peripheral surface 224 and the sliding surface 220, is convexly rounded toward the outer side. That is, an R-chamfer (i.e., a round chamfer) is formed between the outer peripheral surface 224 and the sliding surface 220.

Although a slope angle of the sloped surface X21 relative to the sliding surface 140 varies depending on a location along the sloped surface X21, an average slope angle of the sloped surface X21 is larger than 0° and is smaller than 90°. Furthermore, the slope angle is larger than 0° and is smaller than 90° at any location along the sloped surface X21. Here, the average slope angle is a slope angle of a plane that connects an edge portion of the sloped surface X21 located on the sliding surface 220 side to an edge portion of the sloped surface X21 located on the outer peripheral surface 224 side. The sloped surface X21, which is configured in the above-described manner, can achieve advantages, which are similar to those achieved with the sloped surface X21 of the second embodiment.

The modification discussed in the present embodiment can also be applied in the same way to each of the sloped surfaces X23, X11, X13, X15 in addition to the sloped surface X21. Furthermore, the modification discussed in the present embodiment can be also applied in the same way to each of the sloped surfaces X21, X23, X11, X13, X15 which is joined with the corresponding auxiliary surface X22, X24, X12, X14, X16, as in the first embodiment.

Fourth Embodiment

Figure 14:
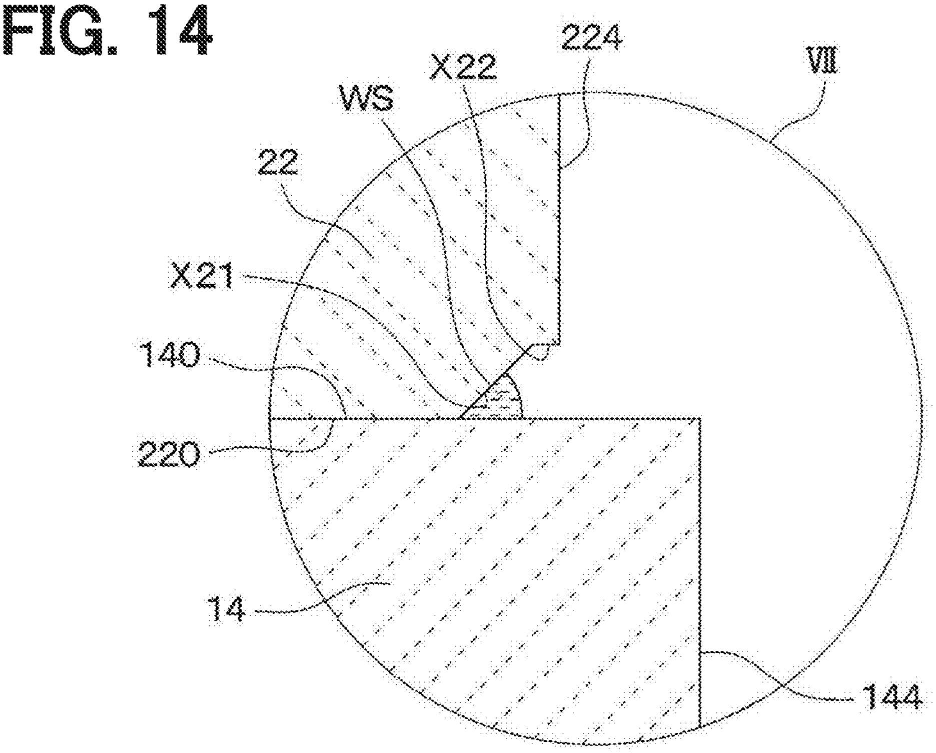
FIG. 14 is an enlarged view of the section VII according to a fourth embodiment.

The fourth embodiment will be described with reference to FIG. 14. The present embodiment differs from the first embodiment with respect to the shape of the stationary valve element 14. The rest of the structure of the present embodiment is the same as that of the first embodiment.

Unlike the first embodiment, at the stationary valve element 14 of the present embodiment, a chamfer is not formed between the sliding surface 140 and the outer peripheral surface 144, and a 90 degree sharp corner joins between the sliding surface 140 and the outer peripheral surface 144. Even with this configuration, advantages, which are similar to those of the first embodiment can be achieved with the sloped surface X21 and the auxiliary surface X22.

Unlike the first embodiment, a chamfer may not be formed between the sliding surface 140 and the central inner peripheral surface 146, and a 90 degree sharp corner may join between the sliding surface 140 and the central inner peripheral surface 146.

Fifth Embodiment

Figure 15:
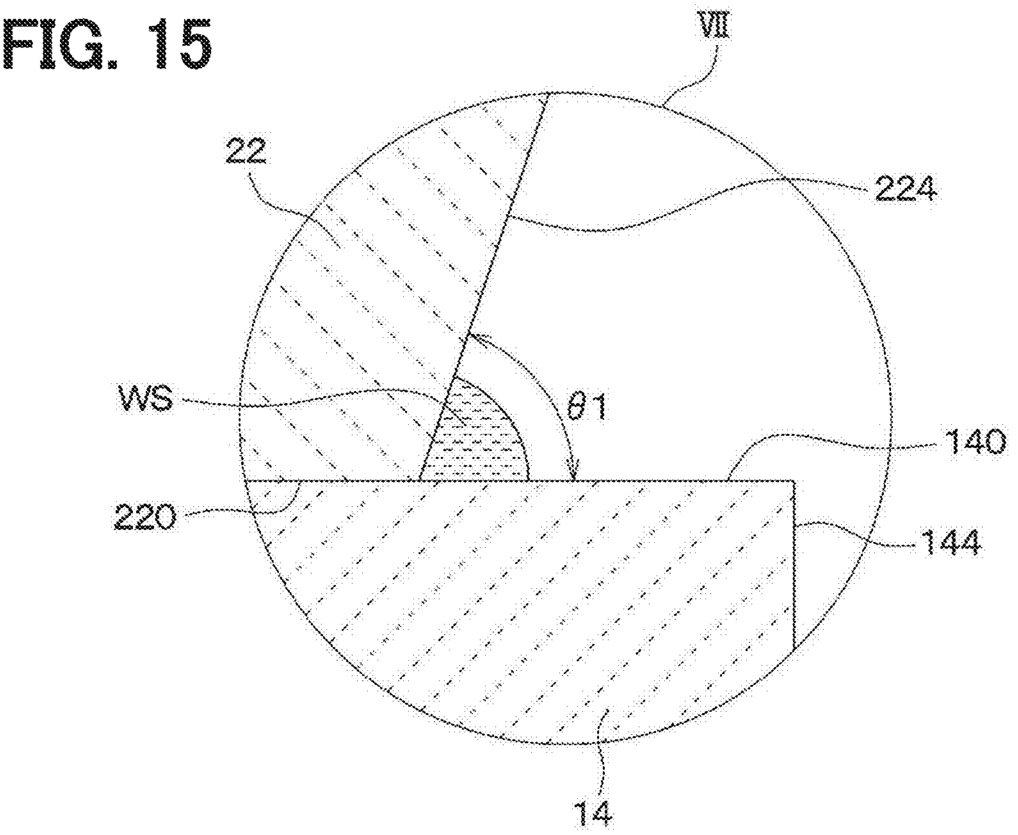
FIG. 15 is an enlarged view of the section VII according to a fifth embodiment.

The fifth embodiment will be described with reference to FIG. 15. The present embodiment differs from the fourth embodiment with respect to the shape of the drive valve element 22. The rest of the structure of the present embodiment is the same as that of the fourth embodiment.

At the drive valve element 22 of the present embodiment, the sloped surface X21 and the auxiliary surface X22 of the fourth embodiment are both eliminated. That is, the chamfer is eliminated from the drive valve element 22. Furthermore, the outer peripheral surface 224 and an outer peripheral end of the sliding surface 220 are joined with each other.

Furthermore, the outer peripheral surface 224 is sloped by an acute angle relative to the sliding surface 140. That is, a slope angle θ1 of the outer peripheral surface 224 relative to the sliding surface 140 is larger than 0° and is smaller than 90°. Here, the slope angle θ1 refers to a slope angle defined in a gap (i.e., an empty side where the wall is absent) between the drive valve element 22 and the stationary valve element 14.

(1) As described above, the outer peripheral surface 224 of the present embodiment is joined to the sliding surface 220 and is also joined to the inlet surface 229 which is opposite to the sliding surface 220. Furthermore, since the outer peripheral surface 224 is sloped by the acute angle relative to the sliding surface 140, a portion of the outer peripheral surface 224, i.e., an adjacent portion of the outer peripheral surface 224, which is adjacent to the sliding surface 220, functions as a sloped surface.

That is, when the water-based coolant is drained out, a puddle WS of the water-based coolant is likely formed by the surface tension in a space formed between this sloped surface and the sliding surface 140. This puddle WS guards the area around the edge portion of the sliding surface 220 which is placed on the outer peripheral surface 224 side. Therefore, the solidification of the residual components between the sliding surface 140 and the sliding surface 220 is less likely to occur. In this way, the possibility of interference with the sliding movement between the stationary valve element 14 and the drive valve element 22 is reduced.

The modification is made in the present embodiment such that the chamfer is eliminated, and the outer peripheral surface 224 is joined to the sliding surface 220, and the outer peripheral surface 224 is sloped by the acute angle relative to the sliding surface 140. This modification can be applied in the same way to each of the central inner peripheral surface 223 and the flow passage inner peripheral surface 221 in addition to the outer peripheral surface 224. Even in this case, advantages, which are similar to the above-described advantages, can be achieved.

Furthermore, in another case where the chamfer is eliminated, and the outer peripheral surface 144, the first flow passage inner peripheral surface 141, the second flow passage inner peripheral surface 142 and the central inner peripheral surface 146 are joined to the sliding surface 140 and are sloped by the acute angle relative to the sliding surface 220, advantages, which are similar to the above-described advantages, can be achieved.

The modification of the present embodiment, which is modified relative to the fourth embodiment, can be equally applied to any of the first to third embodiments. Furthermore, in the present embodiment, the advantages, which are achieved by the structure of any of the other embodiments, can be also achieved by the similar structure of the present embodiment which is similar to the other embodiment.

Sixth Embodiment

Figure 16:
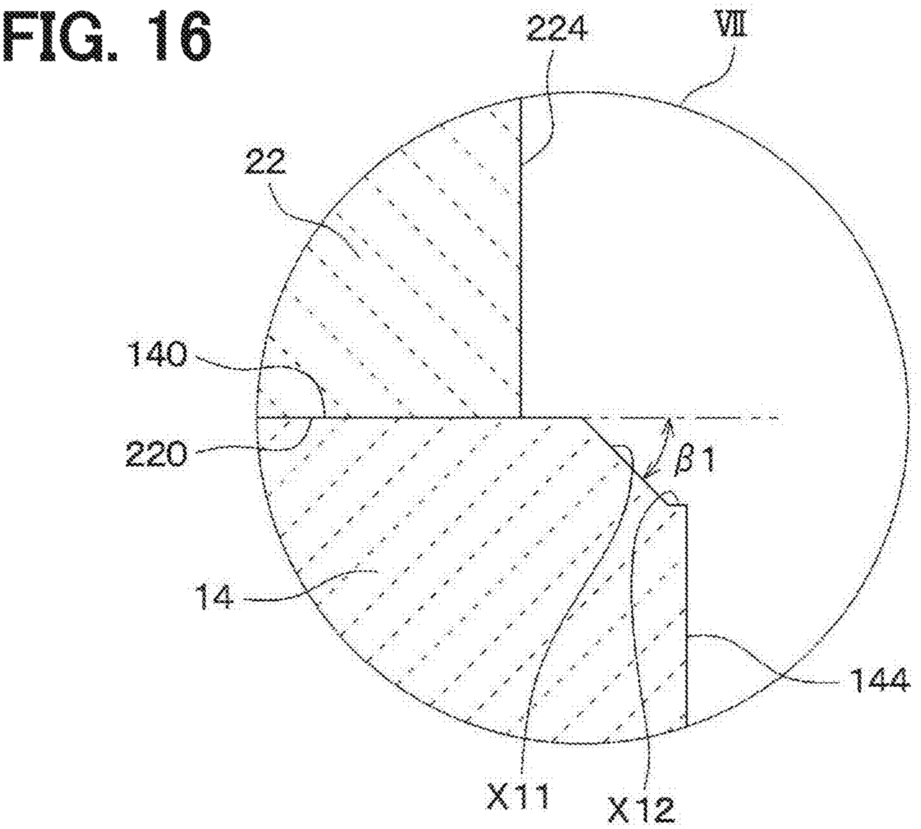
FIG. 16 is an enlarged view of the section VII according to a sixth embodiment.
Figure 17:
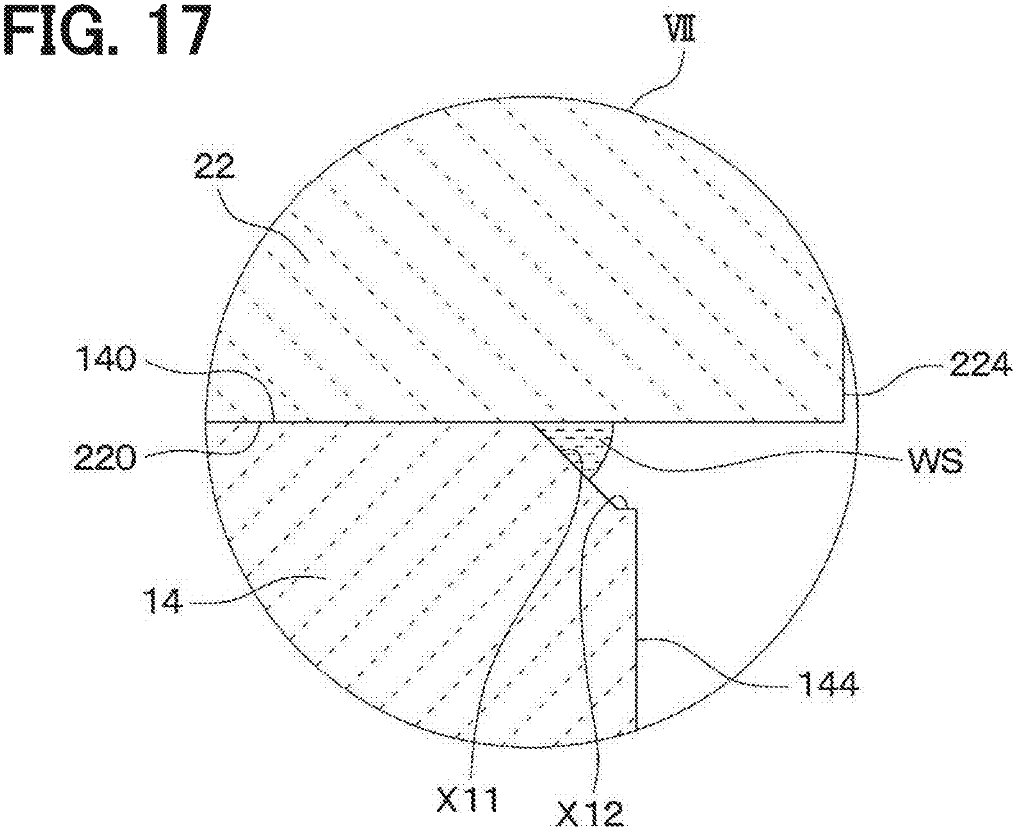
FIG. 17 is an enlarged view of the section VII at the time of occurrence of positional deviation between the valve elements.

Next, the sixth embodiment will be described with reference to FIGS. 16 and 17. The present embodiment differs from the first embodiment with respect to the shape of the drive valve element 22. The rest of the structure of the present embodiment is the same as that of the first embodiment.

At the drive valve element 22 of the present embodiment, the sloped surface X21 and the auxiliary surface X22 of the first embodiment are both eliminated. That is, the chamfer is eliminated. Furthermore, the outer peripheral surface 224 and the sliding surface 220 are joined with each other by a generally 90 degree sharp corner.

As described in the first embodiment, the gap is formed between the central inner peripheral surface 146 and the shaft core 181 and also between the central inner peripheral surface 223 and the shaft core 181. Therefore, a position of the stationary valve element 14 and a position of the drive valve element 22 relative to the shaft core 181 may possibly be changed. For example, in a normal case, as shown in FIG. 16, the outer peripheral surface 144 of the stationary valve element 14 protrudes outward in the radial direction DRr relative to the outer peripheral surface 224 of the drive valve element 22. However, as shown in FIG. 17, in some cases, a positional deviation may possibly occur at the stationary valve element 14 and/or the drive valve element 22 to cause the outer peripheral surface 224 to protrude outwardly in the radial direction DRr relative to the outer peripheral surface 144.

Now, for the descriptive purpose, it is assumed that the operation of the valve device 10 is stopped in this state, and the water-based coolant is drained out. In this case, as shown in FIG. 17, when the sloped surface X11 is sloped by the acute angle relative to the sliding surface 220, the puddle WS of the water-based coolant can be easily formed by the surface tension in the space between the sloped surface X11 and the sliding surface 220.

This puddle WS guards the area around the edge portion of the sliding surface 140 which is placed on the outer peripheral surface 144 side. Even in the case where the water-based coolant is drained out in the state, in which the positional deviation is made, the solidification of the residual components between the sliding surface 140 and the sliding surface 220 is less likely to occur. In this way, the possibility of interference with the sliding movement between the stationary valve element 14 and the drive valve element 22 is reduced.

As described above, since the slope angle of the auxiliary surface X12 relative to the sliding surface 220 is smaller than the slope angle of the sloped surface X11 relative to the sliding surface 220, the volume of the puddle WS can be made larger in comparison to the case where the auxiliary surface X12 is absent, and thereby, it is possible to delay the evaporation of the puddle WS. Furthermore, since a size of an opening of a gap, which is formed between: the sloped surface X11 and the auxiliary surface X12; and the sliding surface 220, is reduced, it is possible to delay the evaporation of the puddle WS formed in this gap.

Furthermore, although not depicted in the drawing, in the first embodiment, the sloped surface X23 and the auxiliary surface X24 may be eliminated, and the central inner peripheral surface 223 and the sliding surface 220 may be joined with each other by a generally right angle. In this case, the water-based coolant may possibly be drained out after the termination of the operation of the valve device 10 in a misaligned state where the central inner peripheral surface 223 protrudes more toward the shaft core 181 than the central inner peripheral surface 146. In such a case, when the sloped surface X13 is sloped by the acute angle relative to the sliding surface 220, a puddle of the water-based coolant can be easily formed by the surface tension in a space formed between the sloped surface X13 and the sliding surface 220. Furthermore, as described above, since the slope angle of the auxiliary surface X14 relative to the sliding surface 220 is smaller than the slope angle of the sloped surface X13 relative to the sliding surface 220, the volume of the puddle WS can be made larger in comparison to the case where the auxiliary surface X14 is absent, and thereby, it is possible to delay the evaporation of the puddle WS. Furthermore, since the size of the opening of the gap, which is formed between: the sloped surface X13 and the auxiliary surface X14; and the sliding surface 220, is reduced, it is possible to delay the evaporation of the puddle WS formed in this gap.

The modification of the present embodiment, which is modified relative to the first embodiment, can be equally applied to any of the other embodiments. Furthermore, in the present embodiment, the advantages, which are achieved by the structure of any of the other embodiments, can be also achieved by the similar structure of the present embodiment which is similar to the other embodiment.

Other Embodiments

The present disclosure is not limited to the above embodiments, and the above embodiments may be appropriately modified. Further, the above embodiments are not unrelated to each other and can be appropriately combined unless the combination is clearly impossible. Furthermore, in each of the embodiments described above, the elements of the embodiment are not necessarily essential except when it is clearly indicated that they are essential and when they are clearly considered to be essential in principle. In each of the above embodiments, when a numerical value such as the number, numerical value, amount, range or the like of the constituent elements of the embodiment is mentioned, the present disclosure should not be limited to such a numerical value unless it is clearly stated that it is essential and/or it is required in principle. In particular, when multiple values are illustrated for a given quantity, it is also possible to adopt a value between those multiple values, except when specifically noted otherwise and when clearly impossible in principle. In each of the above embodiments, when the shape, the positional relationship or the like of the constituent elements of the embodiment are mentioned, the present disclosure should not be limited the shape, the positional relationship or the like unless it is clearly stated that it is essential and/or it is required in principle. Furthermore, the present disclosure also permits the following variations and variations of equivalent scope to each of the above embodiments. Application and non-application of the following variations to the embodiments described above can be independently selected. In other words, any combination of the following variations can be applied to the embodiments described above.

Modification 1

In the embodiments described above, the example of the liquid, the flow of which is conducted in the flow passage in the valve device 10 and is regulated by the valve device 10, is the water-based coolant which contains the water. However, the liquid may be: a liquid, which does not contain the water; or a liquid used for a purpose other than that of the water-based coolant.

Modification 2

In the embodiments described above, the valve device 10 is used for the vehicle and is installed at the vehicle. However, the valve device 10 may not be installed at the vehicle.

Modification 3

Although the valve device 10 is the three-way valve in the embodiments described above, the valve device 10 may be a four-way valve or a multi-way valve having more than four ports. Alternatively, the valve device 10 may be a valve that simply regulates the flow rate of the liquid without switching the flow passage from one to another.

Modification 4

In the embodiments described above, the sliding surfaces 140, 220 slide relative to each other by rotating the drive valve element 22 without rotating the stationary valve element 14. Alternatively, the sliding surfaces 140, 220 may slide relative to each other by rotating both of the stationary valve element 14 and the drive valve element 22.

What is claimed is:

1. A valve device configured to regulate a flow rate of a liquid, which is a water-based coolant, at a vehicle, the valve device comprising:

a first valve element that is placed in a first flow passage which is configured to conduct the liquid; and a second valve element that is placed in the first flow passage, wherein:

a surface of the first valve element has a first sliding surface which is opposed to the second valve element;

a surface of the second valve element has a second sliding surface which is opposed to the first valve element;

the first sliding surface and the second sliding surface are configured to slide relative to each other to change an opening degree of an opening between the first flow passage and a second flow passage;

an edge portion of at least one sliding surface among the first sliding surface and the second sliding surface is joined to a sloped surface which is sloped by an acute angle relative to a mating sliding surface which is another sliding surface among the first sliding surface and the second sliding surface and mates with the at least one sliding surface;

an auxiliary surface is joined to an edge portion of the sloped surface which is opposite to the at least one sliding surface; and a slope angle of the auxiliary surface relative to the mating sliding surface is smaller than a slope angle of the sloped surface relative to the mating sliding surface.

2. The valve device according to claim 1, wherein the sloped surface is a chamfer.

3. The valve device according to claim 1, wherein the sloped surface is not a chamfer, and the sloped surface is joined to the at least one sliding surface and is a portion of a peripheral surface which is joined to an opposite surface that is opposite to the at least one sliding surface.

4. The valve device according to claim 1, comprising:

a shaft that is fixed to the second valve element; and a drive device that includes a stepping motor which is configured to transmit a rotational force to the shaft.

5. The valve device according to claim 1, wherein the first valve element and the second valve element are respectively shaped in a disk valve form.

6. The valve device according to claim 1, wherein:

the second sliding surface is configured to slide relative to the first sliding surface when the second sliding surface is rotated about a central axis; and the sloped surface is joined to an outer peripheral end of the at least one sliding surface which is centered on the central axis.

7. The valve device according to claim 1, wherein the first valve element and the second valve element are respectively formed to include ceramic.

8. The valve device according to claim 1, wherein the liquid contains water.

9. The valve device according to claim 1, wherein the at least one sliding surface, which is joined to the sloped surface, is one of the first sliding surface and the second sliding surface which has an outer diameter smaller than an outer diameter of another one of the first sliding surface and the second sliding surface.

* * * * *